(12) United States Patent
Schreck et al.

(10) Patent No.: US 10,002,186 B2
(45) Date of Patent: Jun. 19, 2018

(54) SYSTEM AND METHOD FOR PRECISE QUANTILE DETERMINATION

(71) Applicant: Software AG, Darmstadt (DE)

(72) Inventors: Daniel Schreck, Saarbrücken (DE); Sebastian Millies, Gersheim (DE)

(73) Assignee: Software AG, Darmstadt (DE)

( * ) Notice: Subject to any disclaimer, the term of this patent is extended or adjusted under 35 U.S.C. 154(b) by 0 days. days.

(21) Appl. No.: 15/062,574

(22) Filed: Mar. 7, 2016

(65) Prior Publication Data

US 2016/0188705 A1 Jun. 30, 2016
US 2017/0161361 A9 Jun. 8, 2017

Related U.S. Application Data

(63) Continuation-in-part of application No. 14/481,211, filed on Sep. 9, 2014.

(Continued)

(51) Int. Cl.
*G06F 7/00* (2006.01)
*G06F 17/30* (2006.01)

(52) U.S. Cl.
CPC .. *G06F 17/30675* (2013.01); *G06F 17/30486* (2013.01); *G06F 17/30699* (2013.01); *G06F 17/30719* (2013.01)

(58) Field of Classification Search
CPC ......... G06F 17/30675; G06F 17/30477; G06F 17/30486; G06F 17/30699; G06F 17/30719

(Continued)

(56) References Cited

U.S. PATENT DOCUMENTS 6,108,658 A    8/2000  Lindsay et al.
6,343,288 B1   1/2002  Lindsay et al.

(Continued)

OTHER PUBLICATIONS

Gurmeet Singh Manku et al., "Approximate Medians and other Quantiles in One Pass and with Limited Memory", Proceedings of the 1998 ACM SIGMOD International Conference on Management of Data, pp. 426-435, Jun. 1-4, 1998, Seattle, Washington, USA.

(Continued)

*Primary Examiner* — Hosain Alam
*Assistant Examiner* — Nicholas Allen
(74) *Attorney, Agent, or Firm* — Posz Law Group, PLC

(57) ABSTRACT

Precise quantile determination in a distributed environment is provided where data is distributed among worker nodes, one of which functions as a coordinator node. Each worker node has local data for precise quantile determination. The coordinator node derives a maximum relative error value ε which guarantees an exact result for every quantile can be determined in two passes with optimal memory consumption on this node. The worker nodes perform a distributed computation of quantile summaries of datapoints, that specify lower and upper bounds of quantile ranks for selected datapoints. The coordinator node merges the quantile summaries and determines, for each quantile rank, lower and upper bounds for values between which the quantile must occur. The worker nodes filter out, in a second pass, those datapoints that are not within the bounds and stream the qualifying data to the coordinator node. The coordinator node computes precise quantiles from the qualifying data.

12 Claims, 9 Drawing Sheets

Related U.S. Application Data

(60) Provisional application No. 62/043,543, filed on Aug. 29, 2014.

(58) Field of Classification Search
USPC .......................................................... 707/748
See application file for complete search history.

(56) References Cited

U.S. PATENT DOCUMENTS

| | | | |
|---|---|---|---|
| 8,868,573 B2 | 10/2014 | Chu et al. | |
| 2007/0136285 A1* | 6/2007 | Cormode | H04L 41/147 |
| 2010/0153064 A1* | 6/2010 | Cormode | G06F 17/18 |
| | | | 702/179 |
| 2013/0218909 A1* | 8/2013 | Chu | G06F 17/3007 |
| | | | 707/752 |
| 2013/0325825 A1* | 12/2013 | Pope | G06F 17/30283 |
| | | | 707/700 |

OTHER PUBLICATIONS

Michael Greenwald et al., "Space-Efficient Online Computation of Quantile Summaries", Proceedings of the 2001 ACM SIGMOD International Conference on Management of Data. Santa Barbara, California, USA. May 21-24, 2001.

Qi Zhang et al., "A Fast Algorithm for Approximate Quantiles in High Speed Data Streams", Proceedings of the 19th International Conference on Scientific and Statistical Database Management, p. 29, Jul. 9-11, 2007.

Lixin Fu et al., "Novel Algorithms for Computing Medians and Other Quantiles of Disk-Resident Data", Proceedings of the 2001 International Database Engineering and Applications Symposium, pp. 145-154, Jul. 16-18, 2001.

Michael Greenwald et al., "Power-Conserving Computation of Order-Statistics over Sensor Networks", University of Pennsylvania Scholarly Commons, Jun. 14, 2004.

J. I. Munro et al., "Selection and sorting with limited storage", in Theoretical computer science vol. 12, 1980 I. (Abstract only).

Ira Pohl, "A Minimum Storage Algorithm for Computing the Median", Technical Report IBM Research Report RC 2701 (#12713), IBM T J Watson Center, Nov. 1969. (Abstract only).

Graham Cormode et al., "Holistic Aggregates in a Networked World: Distributed Tracking of Approximate Quantiles", SIGMOD 2005, Jun. 14-16, 2005, Baltimore, MD.

John M. Chambers et al., "Monitoring Networked Applications With Incremental Quantile Estimation", in Statistical Science 2006, vol. 21, No. 4.

Office Action issued by the U.S. Patent Office dated Mar. 8, 2017 in related U.S. Appl. No. 14/481,211.

* cited by examiner

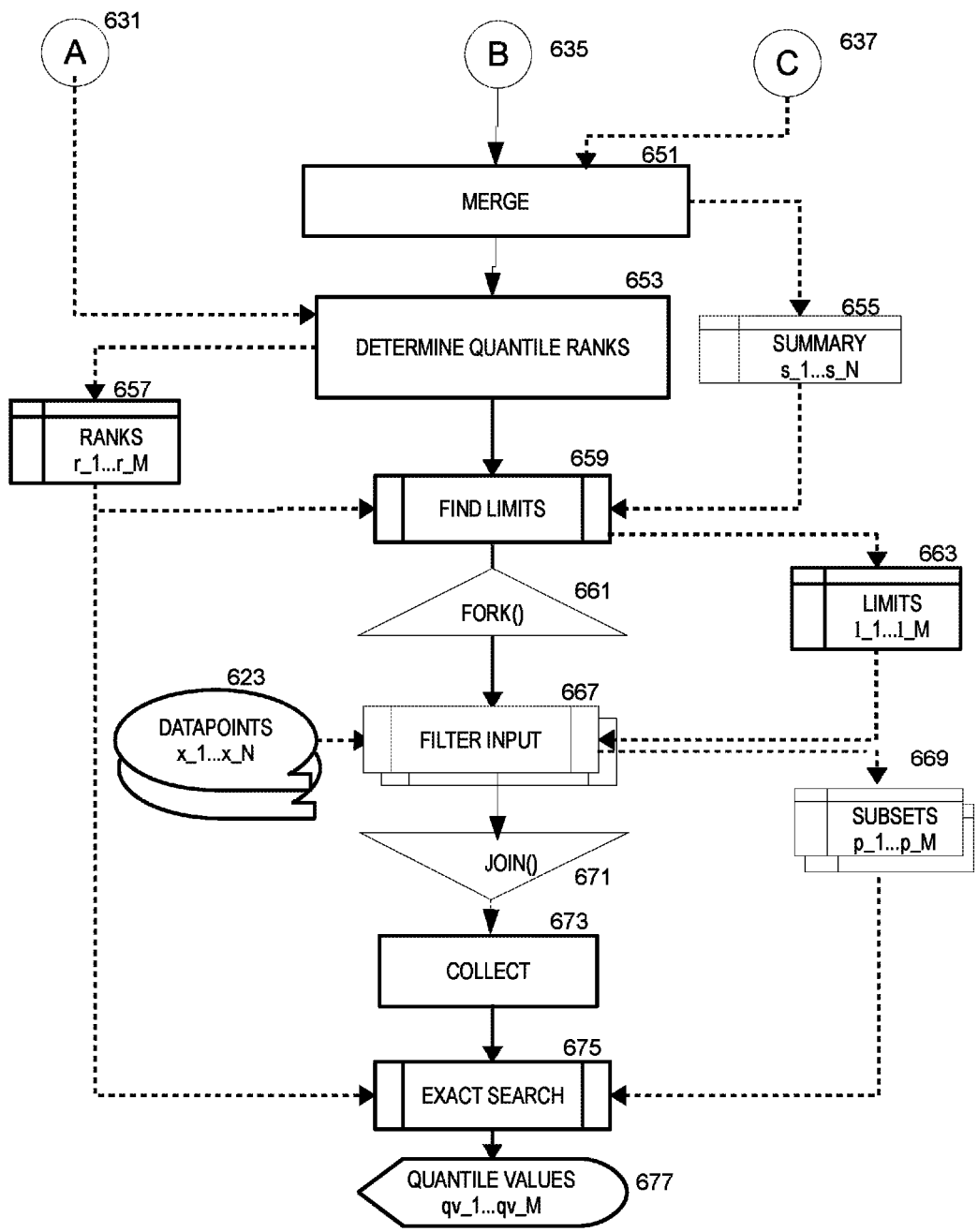

SYSTEM AND METHOD FOR PRECISE QUANTILE DETERMINATION

CROSS-REFERENCE TO RELATED APPLICATIONS

This application is a continuation-in-part of U.S. patent application Ser. No. 14/481,211, filed 9 Sep. 2014, which claims the benefit of the following Provisional application: 62/043,543 filed 29 Aug. 2014, all of which are expressly incorporated herein by reference.

TECHNICAL FIELD

The technical field relates in general to statistical analysis using quantile determination.

BACKGROUND

Statistical measures play an important role for the analysis of data sets. One general class of such statistical measures consists of the quantiles of a set of data. Quantiles of different ranks can together summarize what data is stored and how it is distributed.

Computers permit rapid evaluation of quantiles of large data sets. While the availability of affordable computer memory (volatile and permanent) is steadily increasing, there continue to be limitations associated with such memory. Typical algorithms will re-order the elements of the data set in place or they will need additional memory that is at least half of the size of the original data set. Several conventional techniques, such as those discussed below, provide various quantile determination algorithms.

Simple and Precise Algorithms.

A typical simple determination algorithm requires sorting the values and then picking the element in the needed position in the array. Such an algorithm needs O(N) space, where N is the number of rows. Assuming, for example, that one datapoint consumes 8 bytes (=64 bits), determining a quantile over N=100 million rows needs 800 MB of temporary memory. Traditional commodity computer hardware provides the capability for using this type of algorithm with only small inputs or may require the user to swap out to a disk. The sorting requires O(N log N) runtime. Such an approach can be used to determine several quantiles on the data without extra memory or runtime cost.

Selection Algorithms.

Better runtime performance could be achieved by using a "Selection algorithm", but just like sorting, it will need space proportional to the number of input elements (https://en.wikipedia.org/w/index.php?title=Selection_algorithm&oldid=622007068). Optimizations regarding the needed memory are possible if only a single quantile is requested and that quantile has a very low or very high quantile rank (for example, 0.1 or 0.9).

Lower Bound for Precise Algorithms.

Pohl (I. Pohl, "A Minimum Storage Algorithm for Computing the Median", Technical Report IBM Research Report RC 2701 (#12713), IBM T J Watson Center, November 1969) proved in 1969 that any deterministic algorithm that computes the exact median in one pass needs temporary storage of at least N/2 elements. Munro and Paterson (J. I. Munro and M. S. Paterson, "Selection and sorting with limited storage", in Theoretical computer science vol. 12, 1980) proved in 1980 that the minimum space required for any precise algorithm is $\Theta(N^{**}1/p)$, with p being the number of passes over the data. Accordingly, a more precise result with less memory than O(N) may be achieved by implementing more passes over the data. In their proof, Munro and Paterson sketch an algorithm for determining the quantiles in several passes with almost no extra memory.

Disk-Based Sorting.

Another conventional alternative is to write the values to disk and then sort them. However, disk-based sorting is orders of magnitude slower than in-memory operation. Therefore, this is not a viable option for interactive applications where response times matter.

Approximation Algorithms.

In more recent times there have been a number of publications that describe low memory quantile calculations that give up some of the precision requirements in favor of lower memory consumption. Three of these known techniques are now discussed.

1. Manku, Rajagopalan, and Lindsay (1998)

In 1998 Manku, Rajagopalan, and Lindsay (G. Manku, S. Rajagopalan, B. Lindsay, "Approximate medians and other quantiles in one pass and with limited memory", in Proceedings of the 1998 ACM SIGMOD International Conference on Management of Data) presented an approximation algorithm as an improvement on Munro and Paterson's 1980 work:

Space: $O(1/\varepsilon \log^2(\varepsilon N))$
Runtime: not stated

The error $\varepsilon$ is the factor by which a quantile reported by the algorithm may differ from the real quantile. A quantile is said to be "$\varepsilon$-approximate" if its real rank is guaranteed to be within $\lfloor r-\varepsilon N; r+\varepsilon N \rfloor$ of the rank r of the reported quantile value. This is not to be confused with the number of precise digits of the reported value. Results are proven to be $\varepsilon$-approximate. As seen above, the memory requirement depends on the desired maximum error.

Manku, et al. built upon the algorithm described by Munro and Paterson in 1980. They change one pass of the original algorithm so that this one pass yields a quantile that is correct within the error bounds. After just a single pass they have the approximate quantile. Manku et al. assert that their algorithm needs less space than that of Munro and Paterson. Related patents are U.S. Pat. No. 6,108,658A and U.S. Pat. No. 6,343,288B1.

2. Greenwald, Khanna (2001)

In 2001, Greenwald and Khanna (M. Greenwald, S. Khanna, "Space-efficient Online Computation of Quantile Summaries", in Proceedings of the 2001 ACM SIGMOD International Conference on Management of Data) presented an algorithm for the space-efficient computation of quantile summaries.

Space: $O(1/\varepsilon \log(\varepsilon N))$
Runtime: high cost (not reported)

Results were proven to be $\varepsilon$-approximate. As seen above, the memory requirement depends on the desired maximum error.

Real-world results have been obtained through a modified version of the algorithm, rather than the one outlined in the Greenwald and Khanna article. With the modified variant, the memory requirements in terms of stored items were about half as big as for the Manku et al. method, but the needed data structures are more complex.

3. Zhang, Wang (2007)

In 2007, Zhang and Wang (Qi Zhang, Wei Wang, "A Fast Algorithm for Approximate Quantiles in High Speed Data Streams," in 19th International Conference on Scientific and Statistical Database Management, 2007) presented an algorithm for the computation of approximate quantiles with the following space and time complexities:

Space: $O(1/\varepsilon \ \log^2(\varepsilon N))$

Runtime: $O(N \ \log(1/\varepsilon \ \log(\varepsilon N)))$

Zhang and Wang demonstrated through several experiments that their algorithm is about 200 times faster than Greenwald and Khanna algorithm. The Zhang, Wang algorithm has deterministic bounds on the maximum error. The summary data structure from which the approximate quantile is read as the last step in the execution of the algorithm also contains guaranteed minimum and maximum ranks for all values stored in the summary.

Precise Results Using an Approximation Algorithm.

In 2001, Fu and Rajasekaran (L. Fu, S. Rajasekaran, "Novel Algorithms for Computing Medians and Other Quantiles of Disk-Resident Data", in Proceedings of the 2001 International Database Engineering and Applications Symposium) designed and compared different algorithms for computing quantiles on disk-resident data. Their use case is the computation of quantiles from data residing on a disk with the data being bigger than available main memory. Fu and Rajeskeran assert that in the case of an external algorithm, the key issue is to minimize the number of passes needed to solve the problem. They make use of the Manku et al. algorithm and adapt it to deliver precise results. Fu and Rajasekaran state that "It should be noted here that the original algorithm of Manku et al. was proposed for computing approximate quantiles. We adapt this algorithm for exact selection by using the given rank error guarantee .... The paper of Manku et al .... gives the upper bound of the rank difference between real target and output result. From the error guarantee, we can compute the bounds that bracket the target, thus adapting the approximate quantiling algorithm to the selection problem."

In many application areas the calculation of exact results is essential. In empirical sciences statistical evaluations are at the base of many findings and theories. As data collection in these sciences is often associated with a high cost, the empirical significance of the findings is often at stake. At least the calculations on the data that is obtained have to be right and must not add another source of error. In a business domain many companies base important business decisions on statistical evaluations. It is imperative that costly decisions are based on the correct data.

At the same time, with ever growing volumes of data and data analysis becoming increasingly interactive, it is more important than ever that algorithms operate quickly (by working in memory only and using a fast algorithm with a minimum number of passes) and utilize memory efficiently.

Existing algorithms aim to either: (1) deliver a precise result using a fixed amount of memory by trading in runtime performance (for example, multiple passes; Munro and Paterson); or (2) use less memory, but only deliver approximate results (for example, Manku et al.)

The concept of Fu and Rajasekaran of using the approximation algorithm of Manku et al. as an initial step for determining precise quantiles constitutes a mix of both of the points above. It employs an approximation algorithm, but fixes the available memory to 200 KB. Thus, although the authors claim that minimizing the number of passes is essential, the algorithm they use does not provide means for guaranteeing that the number of passes is indeed minimal.

One or more embodiments discussed herein can address the aforementioned problems, with traditional systems, by fixing the number of passes to a certain number, such as two, and then optimizing the amount of required memory. More specifically, this can be achieved by exploiting properties of an approximation algorithm for preprocessing the data in the first pass in such a way that the second pass is guaranteed to find an exact, precise result with acceptable memory consumption.

SUMMARY

Accordingly, one or more embodiments provide a method, system and/or non-transitory computer readable medium for precise quantile determination. The method, system and/or non-transitory computer readable medium may be provided in a non-distributed manner, or may be provided to operate in a distributed environment.

Accordingly, there is provided a method for precise quantile determination comprising receiving, by a processor, datapoints and one or more quantiles to be computed; determining, by the processor, from the datapoints and the one or more quantiles to be computed, a maximum relative error value $\varepsilon$ that guarantees that an exact result for every quantile is determined in no more than two passes; computing, by the processor, in a first pass of the datapoints using an approximation algorithm and $\varepsilon$, a quantile summary of the datapoints that specifies lower and upper bounds of the quantile ranks for selected datapoints; determining, by the processor, for each quantile rank, the lower and upper bounds for values between which the quantile must occur; filtering out, by the processor, in a second pass over the datapoints those datapoints that are not between the lower and upper bounds to provide subsets within the lower and upper bounds; and computing, by the processor, from the quantile ranks and the subsets within the lower and upper bounds, the precise quantiles.

Accordingly, there is also provided a method for precise quantile determination in a system in which data is distributed among nodes in the system, the nodes include a coordinator node and worker nodes, each of the worker nodes having local data for the precise quantile determination. The method includes, by a processor in parallel at each of the worker nodes, determining a number N of datapoints to be computed from the local data of the worker node. The method includes, by a processor at the coordinator node, determining from the number N of datapoints reported from the worker nodes and one or more quantiles to be computed, a maximum relative error value $\varepsilon$ that guarantees that an exact result for every quantile is determined in two passes. The method includes, by the processor in parallel at each of the worker nodes, computing, in a first pass of the datapoints of the local data of each of the worker nodes, using an approximation algorithm and $\varepsilon$, a quantile summary of the datapoints of the local data that specifies lower and upper bounds of the quantile ranks for the datapoints of the local data of each of the worker nodes. The method includes, by the processor at the coordinator node: merging the quantile summaries for the datapoints of the local data of each of the worker nodes, into a constructed summary; and determining, based on the constructed summary, for each quantile rank, the lower and upper bounds for values between which the quantile must occur. The method includes, by the processor in parallel at each of the worker nodes, filtering out, in a second pass over the datapoints of the local data at each of the worker nodes, the datapoints that are not between the lower and upper bounds, to provide subsets of datapoints of the local data within the lower and upper bounds. The method includes, by the processor at the coordinator node: collecting, from the worker nodes, as collected qualifying data, all of the subsets of datapoints of the local data within the lower and upper bounds; and computing, based on the quantile ranks and the collected qualifying data which were collected from the worker nodes, the precise quantiles.

A variation includes streaming, by the worker nodes, the subsets of datapoints of the local data within the lower and upper bounds, to the coordinator node.

According to another embodiment, the value for the maximum relative error $\varepsilon$ is determined by solving the following equations:

$$M_{approx} = (b+3)3dL + hL$$

$$M_{exact} = 4\varepsilon N \, d \, M$$

$$M_{approx} = M_{exact},$$

such that $M_{approx}$ and $M_{exact}$ are memory consumptions, M is the number of requested quantiles, b is a block size for partitioning input buffers, d is memory per entry, L is a number of levels in the quantile summary, h is additional overhead for pointers that connect the levels in the quantile summary, and N is an amount of datapoints.

In another embodiment, when the lower and upper bounds for all quantiles are identical, then the precise quantile determination is complete.

In yet another embodiment, the filtering out step further comprises: collecting, by the processor, the datapoints that lie between the lower and upper bounds; counting/excluding, by the processor, the datapoints that are on or below the lower bound; sorting, by the processor, the datapoints that lie between the lower and upper bounds; selecting, by the processor, a datapoint of a requested rank from the sorted datapoints; and simultaneously correcting, by the processor, the requested rank by the number of datapoints on or below the lower bound. In the distributed case, each subset can be associated with a count of the number of elements of the local data that lie below or on the lower bound. The coordinator can use the union of the subsets and the sum of the offsets to determine the final result.

According to another embodiment, when multiple quantiles are requested simultaneously, the first pass will create a quantile summary once for all of the multiple quantiles.

According to yet another embodiment, the algorithm has a runtime complexity of $O(N \log(1/\varepsilon \log(\varepsilon N)))$, such that N is the size of the input.

An embodiment provides a system for precise quantile determination that includes a memory, and configured to, based on instructions stored in memory, perform a method according to one or more of these embodiments.

Still another embodiment provides a non-transitory computer readable medium, which can perform a method according to one or more of these embodiments.

Yet another embodiment provides a method for precise quantile determination comprising receiving, by a processor, an input of input elements and a number of quantiles to be computed; deriving, by the processor, from a size of the input and the number of quantiles to be computed, a value for $\varepsilon$ that guarantees that an exact result for every quantile can be determined in no more than two passes; computing, by the processor, in a first pass of the datapoints using an approximation algorithm and $\varepsilon$, a quantile summary of the datapoints that specifies lower and upper bounds of the quantile ranks for selected datapoints; determining, for each quantile rank, the lower and upper bounds for values between which the quantile must occur; determining, by the processor, for each quantile, whether the upper and lower bounds are identical and thus there already is an exact result.

The symbol $\varepsilon$ is a maximum relative error. If the upper and the lower bounds for all quantiles are identical, then the precise quantile determination is complete. If there is no exact result for some quantiles, then there is a pass over the input for those quantiles and the method for precise quantile determination further comprises: collecting, by the processor, all input elements that lie between the upper and the lower bounds; counting/excluding, by the processor, the input elements that are on or below the lower bound; sorting, by the processor, the collected input elements that lie between the upper and the lower bounds; selecting, by the processor, an input element of a requested rank from the sorted input elements; and simultaneously correcting, by the processor, the requested rank by the number of datapoints on or below the lower bound.

One, or a combination of more than one, or all, of the above embodiments, can be combined and provided as a single embodiment.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 6A-6B is a flowchart illustrating a method for precise quantile determination according to the second embodiment.

DETAILED DESCRIPTION

Figure 1:
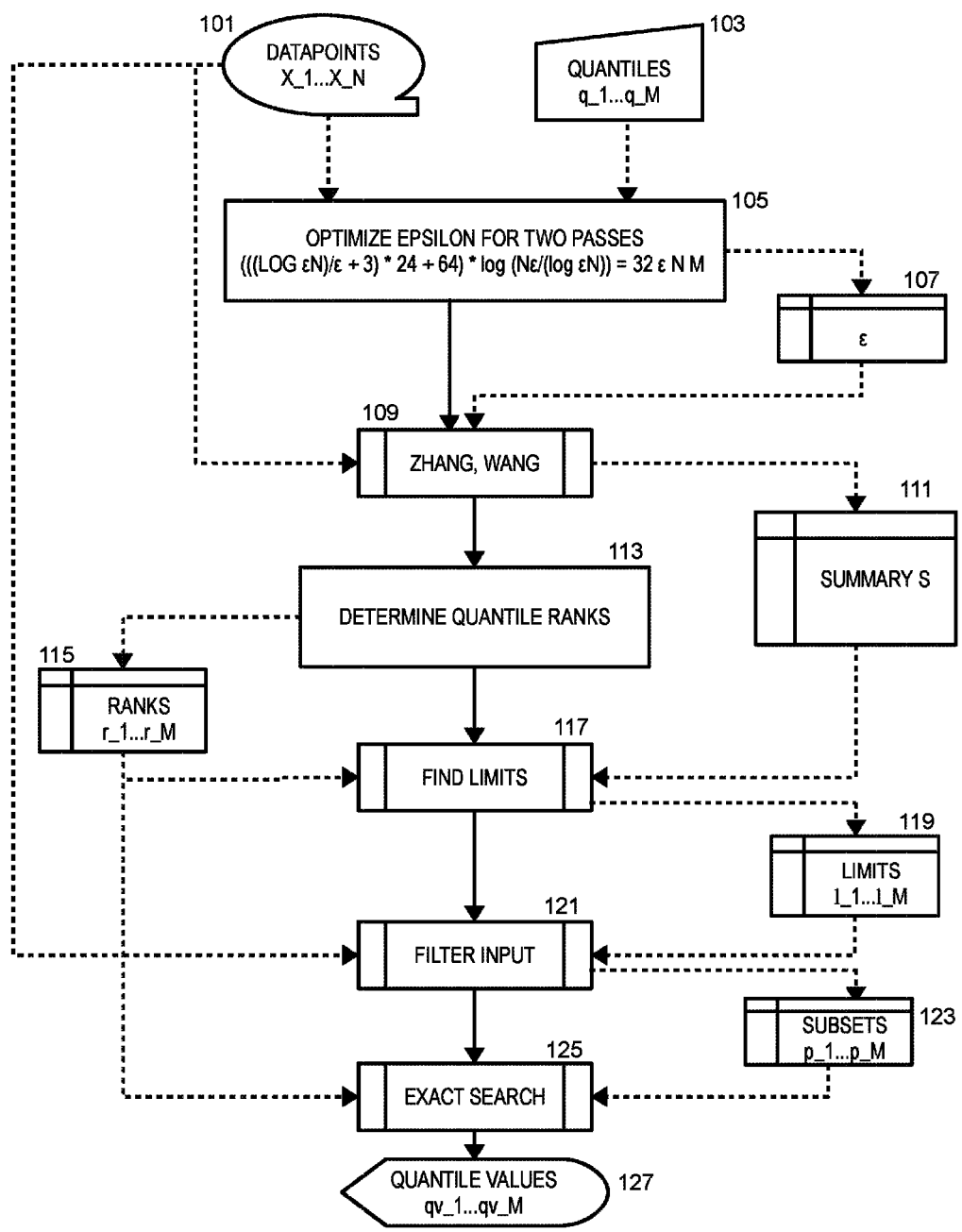
FIG. 1 is a flowchart illustrating a method for precise quantile determination according to a first embodiment.

Quantiles are playing an important role in the area of statistical analysis. In the area of event driven architecture ("EDA") these events have to be analyzed in an optimal way and must be processed quickly and effectively. A set of significant figures of these streams is known as the quantiles. Although the calculation of quantiles is very simple, consuming very large input numbers causes performance and resource (for example, memory) bottlenecks. It is therefore becoming a rather complex field to analyze and disclose any improvements.

In overview, the present disclosure concerns a system and method to precisely determine one or more quantiles on a set of data while consuming little additional memory, and without modifying the input data, all performed with a short runtime. More particularly, various inventive concepts and principles are embodied in methods, devices, and/or systems related to quantile determinations, such as for use in analysis of a set of data, which not only can incorporate an existing, proven, quantile algorithm that is known to find the results with a given error rate (but has other undesirable effects), but which nevertheless demonstrates a good performance and resource usage. The pre-calculated results can be used for the continued calculation that yields exact results, while still adhering to good performance (for example, as measured by the number of passes) and resource usage. The results of the quantiles can be utilized, for example, as a statistical evaluation based on correct data rather than an approximation, such as used in business decisions. A second embodiment provides a variation in which the data can be distributed among two or more computers, such as in a situation that a huge data set is involved and the memory capacity of a single computer is insufficient to handle the huge data set; the method and system can be distributed among multiple servers, in order to speed up the process and cope with very large memory requirements for huge amounts of collected data.

In a first embodiment, discussed in connection with FIG. 1 to FIG. 4, precise quantiles can be obtained from possibly a large amount of collected data, with minimal memory consumption on a single computer. In a second embodiment, discussed in connection with FIG. 5, FIGS. 6A-6B and FIGS. 7A-7B, the determination of precise quantiles (as in the first embodiment) is extended to a situation where data can be distributed among two or more computers. In the following sections, the first embodiment is detailed, followed by a discussion of the second embodiment.

I. CONCEPT

A primary goal is to find exact quantiles with good performance and using little memory. As proven by Munro and Paterson (1980) a single pass algorithm needs at least O(n) space, which is too much. Having many passes will result in poor performance when processing large amounts of data. Thus, it is preferable to find an exact result with a minimum number of passes. Accordingly, the present system fixes the number of passes at two and then optimizes the amount of required memory. This is achieved by exploiting properties of an approximation algorithm that will permit us to use it for preprocessing the data in the first pass in such a way that the second pass is guaranteed to find an exact result with acceptable memory consumption.

First, Section A provides an overview of the overall method, and a discussion of two important features. Then Section B discusses narrowing down the search space, Section C discusses an exact last pass, and Section D discusses minimizing the number of passes and memory consumption. Sections E and F discuss optional features of adaption to hard memory limits, and handling multiple quantiles at one. Section G finishes with a discussion of runtime complexity.

A. Overview

Figure 2:
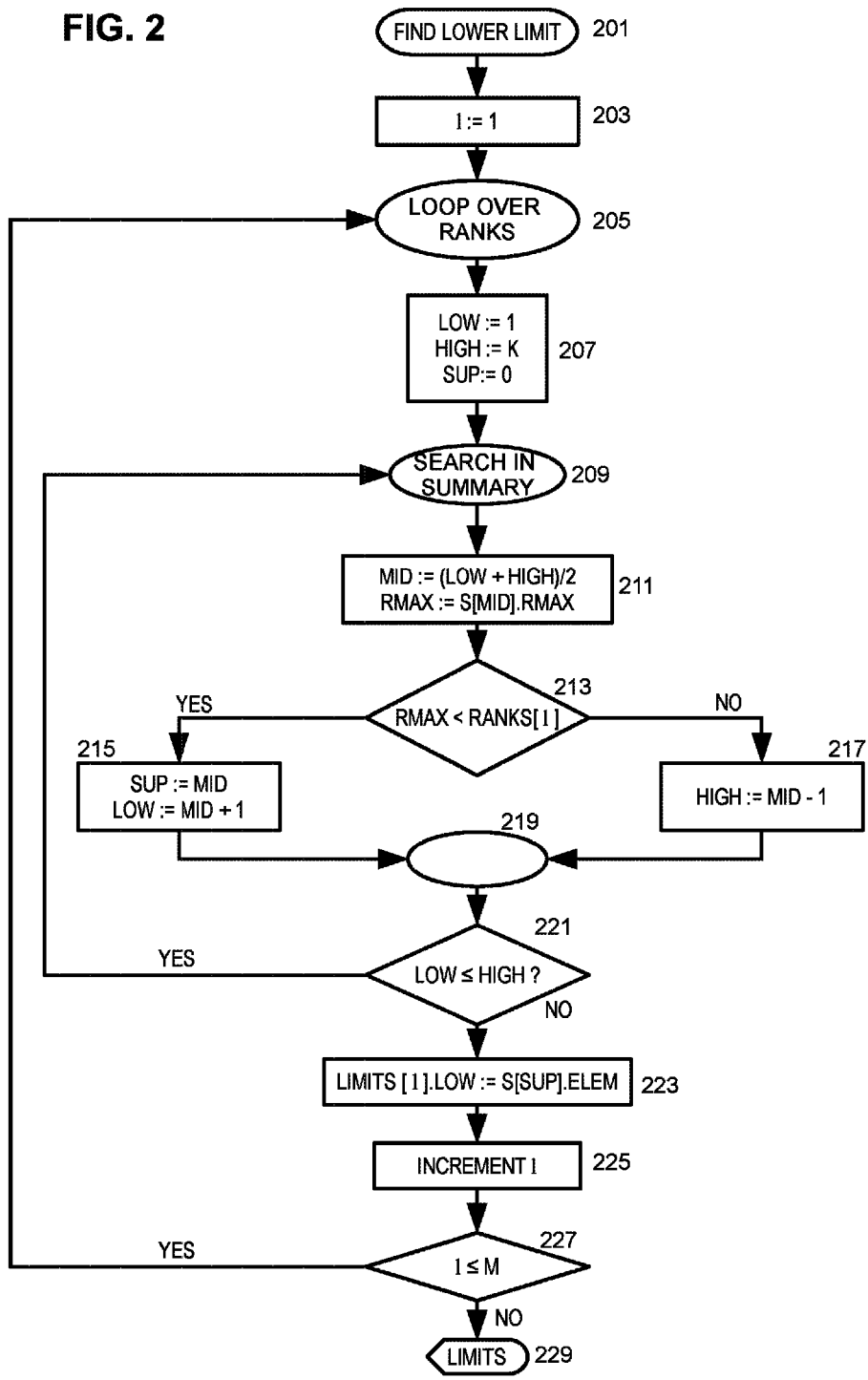
FIG. 2 is a flowchart illustrating a method for finding the lower limit in connection with the first embodiment.
Figure 3:
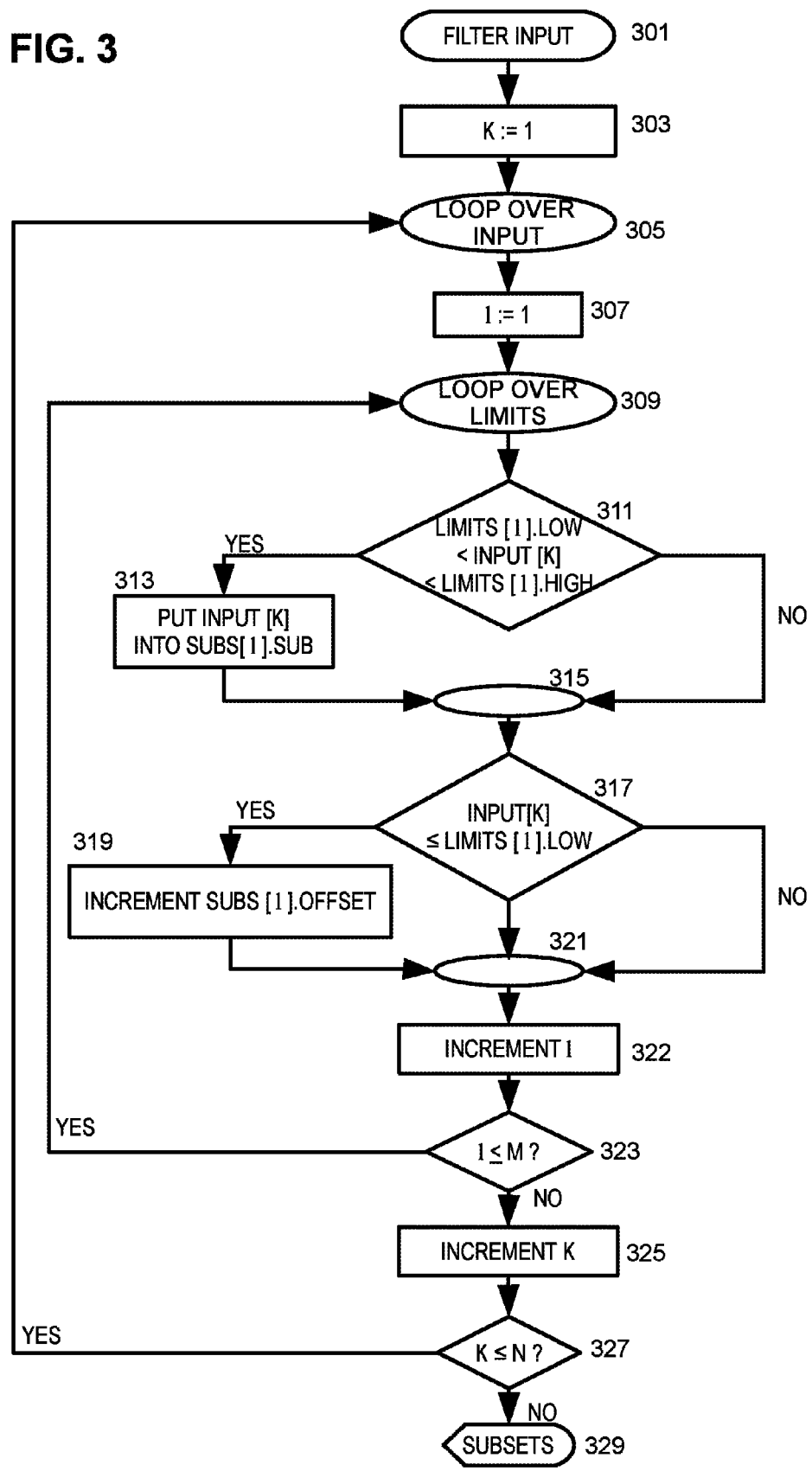
FIG. 3 is a flowchart illustrating a method for filtering the input in connection with the first embodiment.

FIG. 1 provides an overview of the overall method for precise quantile determination, and FIG. 2 and FIG. 3 illustrate two important features of FIG. 1. FIG. 2 is an illustration of finding the limit (using the lower limit, since finding the upper limit is analogous), and FIG. 3 is an illustration of filtering the input.

Reference is made to FIG. 1, which illustrates the overall method for precise quantile determination. In FIG. 1, the solid line indicates control flow and the broken line indicates data flow. Datapoints 101 and quantiles 103 are input to a process to optimize 105 the maximum relative error ε for two passes, for example in accordance with the following:

$$(((\log \varepsilon N)/\varepsilon+3)*24+64)*\log(N\varepsilon/(\log \varepsilon N))=32\varepsilon N M$$

Typically, the datapoints 101 are provided to the overall method as external data with sequential access, and the quantiles can be manually input.

Once ε is determined 107, ε can be stored in internal memory. Then, the known Zhang, Wang approximation algorithm (also referred to herein as the "Zhang, Wang algorithm") can be applied 109, utilizing, as input, the datapoints 101, and ε which resulted from the optimization 105. As is known, the Zhang, Wang approximation algorithm results in a Summary data structure (also referred to herein as a "quantile summary") from which the approximate quantile is read as the last step in the execution of their algorithm, but which also contains guaranteed minimum and maximum ranks for all values stored in the summary S.

The Summary S 111 which results from the Zhang, Wang approximation can be used, along with other data, to a process to find 117 the upper and lower limits. The quantile ranks are determined 113, for example using conventional techniques, resulting in the ranks r_1 ... r_M. The ranks 115 can be stored in memory for further use. Data from the ranks 115 and the Summary S 111 which resulted from the Zhang, Wang approximation algorithm then are input to a process to find 117 the upper and lower limits 119 (which is further discussed in FIG. 2), resulting in limits 119, l_1 ... l_M. The datapoints 101 and the limits 119 are provided as input to a filter input process 121 (which is the second pass over the datapoints and further discussed in connection with FIG. 3). The filter input process 121 produces subsets 123, p_1 ... p_M, which can be stored in memory for later use. Then, the exact, precise search process 125 can be performed, using, as input, the ranks 115 and the subsets 123, r_1 ... r_M and p_1 ... p_M. The exact, precise search process 125 results in quantile values qv_1 ... qv_M. The quantile values which result can be displayed 127, or otherwise output for further use according to known techniques.

Referencing FIG. 2, the process 117 for determining the limits is illustrated in detail with reference to the lower limit. Note that an analogous process can be used for determining the upper limit. To find the lower limit 201, the variable "l" is set 203 to be the value 1. The process then loops over ranks 205 1 ... M.

In the ranks loop, the process sets 207 the values for LOW (:=1), HIGH (:=K), and SUP (:=0). A search is conducted in the Summary 209 as follows: The MID of the search region is determined as (LOW+HIGH)/2 and the guaranteed maximum rank at that position in the summary S[MID] is stored 211 in RMAX. The process determines 213 whether this maximum rank is smaller than the queried rank RANKS [1]. In the situation that RMAX<RANKS[1] the search must be continued to the right of MID, therefore the process sets 215 SUP:=MID and LOW:=MID+1. In the situation that RMAX>=RANKS[1] the search must be continued to the left of MID, therefore the process sets 217 HIGH:=MID−1. At the connector 219, these values for LOW, and HIGH are considered to determine 221 whether the search region has become so narrow that SUP is the index of the result for this quantile. If LOW is less than or equal HIGH, the binary search continues 209. If not, then the following equation is applied to yield the lower limit for the quantile rank 1:

Limits[1]·LOW:=S[SUP]·elem

After incrementing 225 the variable "1", the process determines 227 whether variable 1≤M, the number of quantile ranks. If so, then the process returns to "loop over ranks" 205. If not, then the upper and lower limit results are returned 229.

Referencing FIG. 3, the filter input process 301 will now be discussed and described. The variable K is initially set 303 at the value 1. The process will loop 305 over input 1 . . . N, for all of the input elements. The variable "1" is set 307 to be the value 1. The process then will loop 309 over limits 1 . . . M, for all of the input limits. The process determines 311 whether the input[K] falls within the upper and lower limits, that is, Limits[1]·low<input[K]<Limits[1]·high. When input[K] falls within the limits, the input[K] is placed 313 into a subset, subs[1]·sub and the process proceeds to connector 315. When input[K] does not fall within the upper and lower limits, then the process proceeds directly to connector 315 without putting input[K] into the subset. From connector 315, a second determination 317 evaluates whether the input[K] is less than or equal to the lower limit, that is, input[K]≤limits[1]·low. When input[K] is less than or equal to the lower limit, then the subset, subs[1]·offset is incremented 319 by 1 and the process proceeds to connector 321. When input[K] is not less than or equal to the lower limit, then the process proceeds directly to connector 321 without incrementing the subset, subs[1]·offset. After incrementing 322 the variable 1, the process then determines 323 whether the variable "1" is less than or equal to M, the number of requested quantile ranks. When the variable "1" is less than or equal to M, then the process returns to loop 309 over limits. When the variable "1" is not less than M, then K is incremented 325 by 1. It is then determined 327 whether K is less than or equal to N, the number of input elements. When K is less than or equal to N, that is, when input elements remain for processing, then the loop 305 over input elements repeats. If not, then the subsets are returned 329.

B. Narrowing Down the Search-Space

The known algorithm from Zhang, Wang is used to create a quantile summary, sometimes referred to herein simply as "summary" or "Summary." Due to the design of the Zhang, Wang algorithm, the quantile summary is guaranteed to contain a value from the input for all possible quantile ranks with a maximum relative error of ε. This means that it contains elements of the input so that the rank distance between two adjacent elements is at most 2ε. In addition to the values, the summary also contains the minimum and maximum possible rank for each of the elements that it contains. In the Zhang, Wang algorithm these minimum and maximum possible ranks are maintained during the execution of the algorithm and used to query the summary for a concrete, yet approximate, quantile in the end.

The guaranteed ranks permit the system to name the region where the precise quantile result is to be found in the input. From the minimum and maximum ranks, it is determined how many datapoints at most exist in the input in this region.

Elements in the input do not have any rank information. Therefore the process has to determine the region using the minimum and maximum values that it can contain. Although not obvious, these can be derived from the summary structure. The intention is to find values as close as possible to the final result, thereby minimizing the search region, but at the same time ensuring that the region is not so narrow that the real value is accidentally discarded. Here the rank information in the summary is essential. The lower bound of the region is the largest element of the summary whose maximum possible rank is smaller than the rank sought. The upper bound is the smallest element whose minimum rank is bigger than the rank sought. Thus, the search region for the next pass is determined.

The algorithm guarantees that it has an element for all quantile ranks so that the rank of the returned element is guaranteed to deviate from the real rank r by εN at most. In other words, a result element has a guaranteed minimum rank of at least r−εN and a guaranteed maximum rank of at most r+εN. If an element in the summary is found that can be used as the approximate result, then the elements below and above it, that fulfill the lower and upper bound criteria mentioned above, are each at most 2εN ranks away. In total the rank difference between lower bound and upper bound can be at most 4εN. So N'≤4εN is the guaranteed maximum size of the remaining region to be searched.

In real-world scenarios, the size of the region can be smaller. In contrast to other algorithms (like the one by Manku et al. that was used by Fu et al.), the summary that the Zhang, Wang algorithm produces can yield a guaranteed maximum region size that is implicitly built during the processing of the input data. The inventors have observed that it is potentially closer to the real size of the region than the theoretical, general guarantees of other algorithms. Thereby, the inventors concluded that the Zhang, Wang algorithm can permit the saving of some additional memory during the next pass over the input data.

C. Exact Last Past

In the last pass, the system can ignore all values outside the determined range and can collect all those values inside the range, for example in a list. At the same time, the system can count how many values have been discarded because they were on or below the lower bound of the range. Once all values have been collected, the system can sort the values and then read the desired quantile value from the rank's location in the sorted list offset by the rank of the lower bound.

D. Minimizing Number of Passes and Memory Consumption

The system can minimize the total number of passes to two and then optimize the amount of required memory. From the known size of the input, the system can determine an optimal ε so that the memory needed by the final exact pass is guaranteed to be the same as or less than the memory needed for the initial approximate pass. This way the system makes optimal use of the memory that needs to be allocated. The optimal ε is determined by equating the memory requirements of the first and second pass for a given N and M (where N is the number of datapoints and M is the number of one or more quantiles to be determined) and solving for ε.

The concrete memory requirements depend on the details of the implementation and the machine architecture. Solving the equation might only be possible through numerical methods.

The algorithm as used in the system disclosed herein can determine the median in two passes over 1 billion (64-bit) elements using about 12 MB of memory. Thus, the system disclosed herein can determine the exact quantile out of 8 GB of memory with just 12 MB of temporary storage. By comparison, the simple precise algorithm would need 8 GB of temporary storage. Thus, the present system needs just 0.15% of the memory which is required by the simple precise algorithm. The algorithm as used in the present system optimizes the memory consumption automatically. Traditional algorithms are incapable of this and therefore require more memory and/or passes, resulting in slower execution.

E. Adaption to Hard Memory Limits

In an optional embodiment, when only a fixed amount of memory is available, the algorithm can be run in more than two passes. This idea is similar to that of Munro and Paterson, but using a better algorithm for determining the search region (that is, the algorithm by Zhang, Wang). The idea is to choose the smallest $\varepsilon$ that permits the algorithm to construct a Summary that still fits into the available memory. If the first pass does not yield a region that is small enough so that the available memory suffices for the exact algorithm, the process will continue running the approximation algorithm on the ever shrinking region until the memory suffices for the exact algorithm. This way, the amount of available memory determines the number of passes needed.

F. Multiple Quantiles

An optional embodiment can handle multiple quantiles. The summary structure that is created in the first pass of the approximate algorithm has approximately correct values for any and all quantiles. If multiple quantiles are requested at once, this first pass will create the summary only once for all of them. Only in subsequent passes does the processing need to be done separately on each of the regions obtained from the single summary for the different quantiles. See, for example, the pseudo code described herein.

G. Runtime Complexity

The two-pass variant of the algorithm needs to read the values twice. The processing in the first pass has a complexity of $O(N \log(1/\varepsilon \log(\varepsilon N)))$ and will narrow down the search space so that only a small fraction of the data will need significant processing in the second pass. All N elements of data have to be checked again, but the significant processing is copying and sorting only the small region of size N' that was determined in the previous pass. This processing has complexity $O(N' \log N')$. As N' is much smaller than N, the value is considered to be negligible. Therefore, the total complexity is the same as for the first pass.

II. IMPLEMENTATION

The implementation and sequence of steps of the precise quantile determination system and method can be implemented along the lines of the following, which are provided by way of example and not limitation:

Step 1. From the size of the input and the number of quantiles to be computed, derive a value for $\varepsilon$ that guarantees that an exact result for every quantile can be found in, at most, two passes. For this purpose, determine the memory requirements for the approximate algorithm, determine the memory requirements for the exact algorithm, and equate the two quantities. In more detail: The Zhang, Wang algorithm internally makes use of a multi-level summary, which finally collapses into the simple structure that can be seen in the pseudo code detailed below. However, for determining the memory requirements, the peak consumption is considered. Zhang, Wang provide the following formulae for the worst case:

Number of levels in the summary: $L=\log^2(N/b)$, where the block size for partitioning the data into buffers is defined as $b=(\log^2 \varepsilon N)/\varepsilon$.

Size of summary $g=(b+3) L$.

In actual fact, each level in the summary carries some additional overhead for pointers that connect the levels, which in the present implementation is $h=64$ bytes. The memory per entry in the summary is $3d=24$ bytes (three 64-bit numbers, with one for the data elements itself and two for the associated limits, as shown in the pseudo-code herein). From this, the following memory consumption, in bytes, may be derived:

$$M_{approx}=(b+3)3dL+hL$$

The memory that is needed for the exact step is proportional to the size of the search region. As the search is done for each requested quantile in parallel, it is also proportional to the number M of quantiles in the query:

$$M_{exact}=4\varepsilon N \, d \, M$$

Our implementation solves the equation $M_{approx}=M_{exact}$ for $\varepsilon$ using an open source library for numeric computation. It is because these typically used libraries do not cope well with discontinuous functions, that we use the block size and level count as defined above. In reality, of course, these quantities are integral values as they are in the paper by Zhang, Wang, as well as in the actual implementation of the Zhang, Wang algorithm which is used. However, the difference is negligible for all but tiny input sizes. The quantities would typically be integral values.

When using a numeric algorithm, care must be taken if N is very small. In that case the numeric solvers might yield wrong results due to the logarithms involved. The precise computation is more effective for these small input sizes, so the sophisticated algorithm is not used at all in this case. A threshold of, for example, N<311 can exist if only one quantile is requested, although this optimization is not shown in the pseudo code below.

Step 2. Employ an implementation of the Zhang, Wang algorithm to compute a summary of the input from which it is possible to derive lower and upper bounds for the ranks each input element can possibly occupy. Incomplete pseudo code for this algorithm may be found in the aforementioned Zhang, Wang reference.

Step 3. For each quantile, determine lower and upper bounds for the values between which an element of the quantile's rank must occur in the input. These bounds are determined by binary search over the rank limits in the summary, and then taking the corresponding values as the bounds.

Step 4. If the lower and upper bounds for all quantiles are identical, then the process is complete. If for any quantile, there is no exact result, then for those quantiles there is a pass over the input and then the following occurs:

a. collect all elements that lie between the limits (exclusive);
 b. count the elements that are on or below the lower bound (these elements must not be included in the subset because the guaranteed upper bound on the required space would be lost in a case where there were many such elements);
 c. sort the collected elements; and
 d. select the element of the requested rank from the sorted subset, correcting the rank for the number of ignored (smaller) elements. The corrected rank can be out of range for the subset of elements in the case that many input elements were equal to one of the subset boundaries. In that case, the lower or upper bound is returned as appropriate.

The processing in step 4a to 4b is illustrated by the pseudo code for the method "filter input" and the corresponding flowcharts in FIG. 1 and FIG. 3. The pseudo code leaves the pass over the input elements implicit for the sake of stating the result more clearly, while the flow chart of FIG. 3 illustrates this loop explicitly.

In an extension of step 4 above, the collection of values with subsequent sorting could be replaced by another selection algorithm with lower memory consumption. In such a case, the memory consumption of this step (for arbitrary quantiles) can be halved at most.

III. EXAMPLE

The two-pass combination of approximation algorithm and precise second pass is more effective than directly applying the precise algorithm if the input is at least as big as a few hundred elements. This would be too much for a practical example in this case. Therefore, one can assume for this example that the equation of the memory consumption of the two algorithms yielded $\varepsilon=0.2$ to demonstrate how the two passes work together to produce a precise quantile value.

Input data (21 elements): 9, 12, 17, 3, 1, 4, 2, 21, 11, 16, 13, 20, 15, 14, 5, 7, 8, 6, 19, 10, 18

The execution of the Zhang, Wang algorithm is illustrated in Table 1. The first column shows the input (if any), the second column shows the specific action that is executed, and the remaining columns show the results of the action. The syntax for the summary contents is as follows: $_iV_x$ with V being the value taken from the input, i being the minimum rank for this occurrence of the value, x being the maximum rank for this occurrence of the value. Several inputs are listed at once if they go into level 0 of the summary one after another. See, for example, descriptions of the different actions in the Zhang, Wang reference. The value b calculated by the algorithm from the given $\varepsilon$ is 10.

TABLE 1

Example of Zhang, Wang Algorithm

| Input | Action | Temporary Storage | Summary Level 0 | Summary Level 1 | Summary Level 2 |
|---|---|---|---|---|---|
| 9 | | | 9 | | |
| 12 | | | 9, 12 | | |
| 17, 3, 1, 4, 2, 21, 11 | (abbreviated) | | 9, 12, 17, 3, 1, 4, 2, 21, 11 | | |
| 16 | Sort level 0 | 1, 2, 3, 4, 9, 11, 12, 16, 17, 21 | | | |
| | COMPRESS with $\varepsilon = 1/b$ | $_1 1_1, {}_3 3_3, {}_5 9_5, {}_7 12_7, {}_9 17_9, {}_{10} 21_{10}$ | | | |
| | Send to level 1 | | | $_1 1_1, {}_3 3_3, {}_5 9_5, {}_7 12_7, {}_9 17_9, {}_{10} 21_{10}$ | |
| 13, 20, 15, 14, 5, 7, 8, 6, 19 | (abbreviated) | | 13, 20, 15, 14, 5, 7, 8, 6, 19 | $_1 1_1, {}_3 3_3, {}_5 9_5, {}_7 12_7, {}_9 17_9, {}_{10} 21_{10}$ | |
| 10 | Sort level 0 | 5, 6, 7, 8, 10, 13, 14, 15, 19, 20 | | $_1 1_1, {}_3 3_3, {}_5 9_5, {}_7 12_7, {}_9 17_9, {}_{10} 21_{10}$ | |
| | COMPRESS with $\varepsilon = 1/b$ | $_1 5_1, {}_3 7_3, {}_5 10_5, {}_7 14_7, {}_9 19_9, {}_{10} 20_{10}$ | | $_1 1_1, {}_3 3_3, {}_5 9_5, {}_7 12_7, {}_9 17_9, {}_{10} 21_{10}$ | |
| | MERGE with level 1 | $_1 1_1, {}_3 3_3, {}_4 5_5, {}_6 7_7, {}_8 9_9, {}_{10} 10_{11}, {}_{12} 12_{13}, {}_{14} 14_{15}, {}_{16} 17_{17}, {}_{18} 19_{18}, {}_{19} 20_{19}, {}_{20} 21_{20}$ | | | |
| | COMPRESS with $\varepsilon = 2/b$ | $_1 1_1, {}_6 7_7, {}_{10} 10_{11}, {}_{14} 14_{15}, {}_{20} 21_{20}$ | | | |
| | Send to level 2 | | | | $_1 1_1, {}_6 7_7, {}_{10} 10_{11}, {}_{14} 14_{15}, {}_{20} 21_{20}$ |
| 18 | | | 18 | | $_1 1_1, {}_6 7_7, {}_{10} 10_{11}, {}_{14} 14_{15}, {}_{20} 21_{20}$ |
| | MERGE all levels | $_1 1_1, {}_6 7_7, {}_{10} 10_{11}, {}_{14} 14_{15}, {}_{15} 18_{20}, {}_{21} 21_{21}$ | | | |

The result of the final "MERGE" of the Zhang, Wang algorithm is called a root summary. This root summary is then used for determining the bounds for the precise second pass over the data.

To find the median (quantile rank 0.5), the quantile rank is multiplied with the number of elements in the input: 0.5×21=10.5. The literature differs as to what integer rank this should be mapped to. Without loss of generality, the assumption is that the user wants to have the upper median and round up. Thus, the rank of the element that is sought must be R=11.

Therefore the root summary is scanned for a lower bound element (L) and an upper bound element (H). Again, L is the largest element with a guaranteed maximum rank (strictly)

less than 11. H is the smallest element with a guaranteed minimum rank strictly greater than 11. In this example, L=7 and H=14.

In the second pass over the input, all elements that are smaller than or equal to L are counted, elements between L and H are collected, and all elements equal to or larger than H are discarded. As illustrated in Table 2, the first column contains the incoming element while the second column lists the decision that the algorithm makes based on the value of the element. Columns number three and four list the number of elements equal to or less than L and the collected elements, respectively.

TABLE 2

Example: Second Pass for Determining the Median

| Input | Decision | Number of elements ≤ L | Collected elements |
|---|---|---|---|
| 9 | Collect (L < 9 < H) | 0 | 9 |
| 12 | Collect (L < 12 < H) | 0 | 9, 12 |
| 17 | Discard (H ≤ 17) | 0 | 9, 12 |
| 3 | Count (3 ≤ L) | 1 | 9, 12 |
| 1 | Count (1 ≤ L) | 2 | 9, 12 |
| 4, 2, 21, 11, 16 | (abbreviated) | 4 | 9, 12, 11 |
| 13, 20, 15, 14, 5 | (abbreviated) | 5 | 9, 12, 11, 13 |
| 7, 8, 6, 19, 10 | (abbreviated) | 7 | 9, 12, 11, 13, 8, 10 |
| 18 | Discard (H ≤ 18) | 7 | 9, 12, 11, 13, 8, 10 |

Afterwards, the simple precise algorithm sorts the collected six elements into the following order: 8, 9, 10, 11, 12, 13.

The requested rank R=11 must be offset against the number of elements smaller than or equal to L. The derived rank within the sorted, collected elements is R'=R−L=11−7=4. Thus the median of the full input is the fourth value within the sorted collection of elements: 11. The algorithm is completed and returns 11 as the result.

The result may be cross-checked by looking at the sorted input (1, 2, 3, 4, 5, 6, 7, 8, 9, 10, 11, 12, 13, 14, 15, 16, 17, 18, 19, 20, 21) and picking the value in the $11^{th}$ position: 11. Accordingly, it is confirmed that the result determined by the algorithm is correct.

This input has a uniform distribution of values. In case of distributions with many occurrences of the same value, the calculation of the derived rank R' can result in a value smaller than 1 or greater than the number of collected elements. In that case the result is L or H, respectively. Then it is determined that there were several elements in the input with the same value as the respective border value.

If more than one quantile was requested, then just one summary is created through the algorithm by Zhang, Wang and then the values for the different parts of the input are collected simultaneously in the second pass. In this example, it is assumed that the user wants to collect not only the median, but also the third quartile (quantile rank 0.75).

As indicated above, $R_{0.5}=11$, $L_{0.5}=7$ and $H_{0.5}=14$. In addition, for the third quartile, $R_{0.75}=16$, $L_{0.75}=14$ and $H_{0.75}=21$. The processing is illustrated in Table 3.

TABLE 3

Example: Second Pass for Determining Both Median and Third Quartile Simultaneously

| | Third quartile | | | Median | | |
|---|---|---|---|---|---|---|
| Input | Decision | #elements ≤ $L_{0.75}$ | Collected elements | Decision | #element ≤ $L_{0.5}$ | Collected elements |
| 9 | Count | 1 | | Collect | 0 | 9 |
| 12 | Count | 2 | | Collect | 0 | 9, 12 |
| 17 | Collect | 2 | 17 | Discard | 0 | 9, 12 |
| 3 | Count | 3 | 17 | Count | 1 | 9, 12 |
| 1 | Count | 4 | 17 | Count | 2 | 9, 12 |
| 4, 2, 21, 11, 16 | (abbreviated) | 7 | 17, 16 | (abbreviated) | 4 | 9, 12, 11 |
| 13, 20, 15, 14, 5 | (abbreviated) | 10 | 17, 16, 20, 15 | (abbreviated) | 5 | 9, 12, 11, 13 |
| 7, 8, 6, 19, 10 | (abbreviated) | 14 | 17, 16, 20, 15, 19 | (abbreviated) | 7 | 9, 12, 11, 13, 8, 10 |
| 18 | Collect | 14 | 17, 16, 20, 15, 19, 18 | Discard | 7 | 9, 12, 11, 13, 8, 10 |

Both collected ranges are then sorted. For the third quartile the result is: 15, 16, 17, 18, 19, 20. The derived rank for the third quartile is $R'_{0.75}=16-14=2$. Thus, the third quartile is 16. In the same way as described above, the median is evaluated as being 11.

Listing - Pseudo Code

```
type quantile = float{0..1}
type epsilon = float{0..1}
type rank = integer
type summary : element summary[ ]          summaries ordered by element rank
record element summary
        elem : float
        rmin : rank                        minimum possible rank of elem
        rmax : rank                        maximum possible rank of elem
record limit
        low : float                        lower bound on elements of some fixed rank
        high : float                       upper bound on elements of some fixed rank
record subset
        sub : bag of float                 subset of input not including the limits
        offset : integer                   input rank of sub's smallest element
        limit : limit
procedure main(Input : float[ ], Query : quantile[ ])
    var N := length of input
    var M := length of Query
    var Ranks : rank[ ]
    for I from 1 to M do
        Ranks[I] := floor(Query[I] * N) + 1    each quantile's rank
    end
    var Eps := optimize epsilon for two passes(N, M)
    var Summary := zhang wang(Input, Eps)      first pass over input
    var Limits := find limits(Summary, Ranks)
    var Subs := filter input(Input, Limits)    second pass over input
    var Quantiles := exact search(N, Subs, Ranks)
    output Quantiles
end
returns a root summary, i.e. the result of the final MERGE(S) in their paper
procedure zhang wang(Input : float[ ], Eps : epsilon) : summary
returns an epsilon so that the limits for every element in the summary are narrow enough to find
the requested quantiles by exact selection, by numerically solving an equation for the memory
requirements of both algorithms.
procedure optimize epsilon for two passes (N : integer, M : integer) : epsilon
    var Eps : epsilon
    var D := 8                         bytes per element (1 64-bit machine words)
    var B := (log Eps*N)/Eps            input block size for computing summary
    var L := log (N/B)                 number of levels in summary
    var H := 64                        overhead (bytes) per summary level
    var ApproxBytes := (B + 3) * 3 * D * L + H * L
    var ExactBytes := 4 * Eps * D * N * M
    solve ApproxBytes = ExactBytes for Eps numerically, for example, using the
    UnivariateSolverUtils from the open source Apache Commons Math project
    return Eps
end
returns lower and upper bounds for the values between which an element of each specified rank
must occur in the input
procedure find limits(S : summary, Ranks : rank[ ]) : limit[ ]
    var Limits : limit[ ]
    for I from 1 to length of Ranks do
        var R := Ranks[I]
        var Idx : integer
        Idx := max({s | S[s].rmax < R})    binary search over S
        Limits[I].low := S[Idx].elem
        Idx := min({s | S[s].rmin > R})    binary search over S
        Limits[I].high := S[Idx].elem
    end
    return Limits
end
returns, for each requested quantile, a subset of input elements that could be that quantile. each
quantile is defined by the corresponding limits. requires one pass over the input, distributing the
elements into the corresponding subsets. this pass is not done if Zhang/Wang has already found
the exact result.
procedure filter input(Input : float[ ], Limits : limit[ ]) : subset[ ]
    var Subs : subset[ ]
    for I from 1 to length of Limits do
        if Limits[I].low < Limits[I].high then
                Subs[I].sub := {x ∈ Input | Limits[I].low < x < Limits[I].high})
                Subs[I].offset := length of {x ∈ Input | x ≤ Limits[I].low})
            end
            Subs[I].limit := Limits[I]
    end
    return Subs
end
```

| Listing - Pseudo Code |
|---|
| returns the requested quantiles from their corresponding subsets<br>procedure exact search(N : integer, Subs : subset[ ], Ranks : rank[ ]) : float[ ]<br>    Qs : float[ ]<br>    for I from 1 to length of Ranks do<br>        sort(Subs[I].sub)                     any standard (in-situ) sorting algorithm<br>        var R := Ranks[I] − Subs[I].offset     rank in subset<br>        if R < 1                                there were many elements on the lower limit<br>            then Qs[I] := Subs[I].limit.low<br>            else if R > length of Subs[I].sub  there were many high elements<br>                then Qs[I] := Subs[I].limit.high<br>                else Qs[I] := Subs[I].sub[R]<br>    end<br>    return Qs<br>end |

IV. COMPUTER SYSTEM IMPLEMENTATION EXAMPLE

Figure 4:
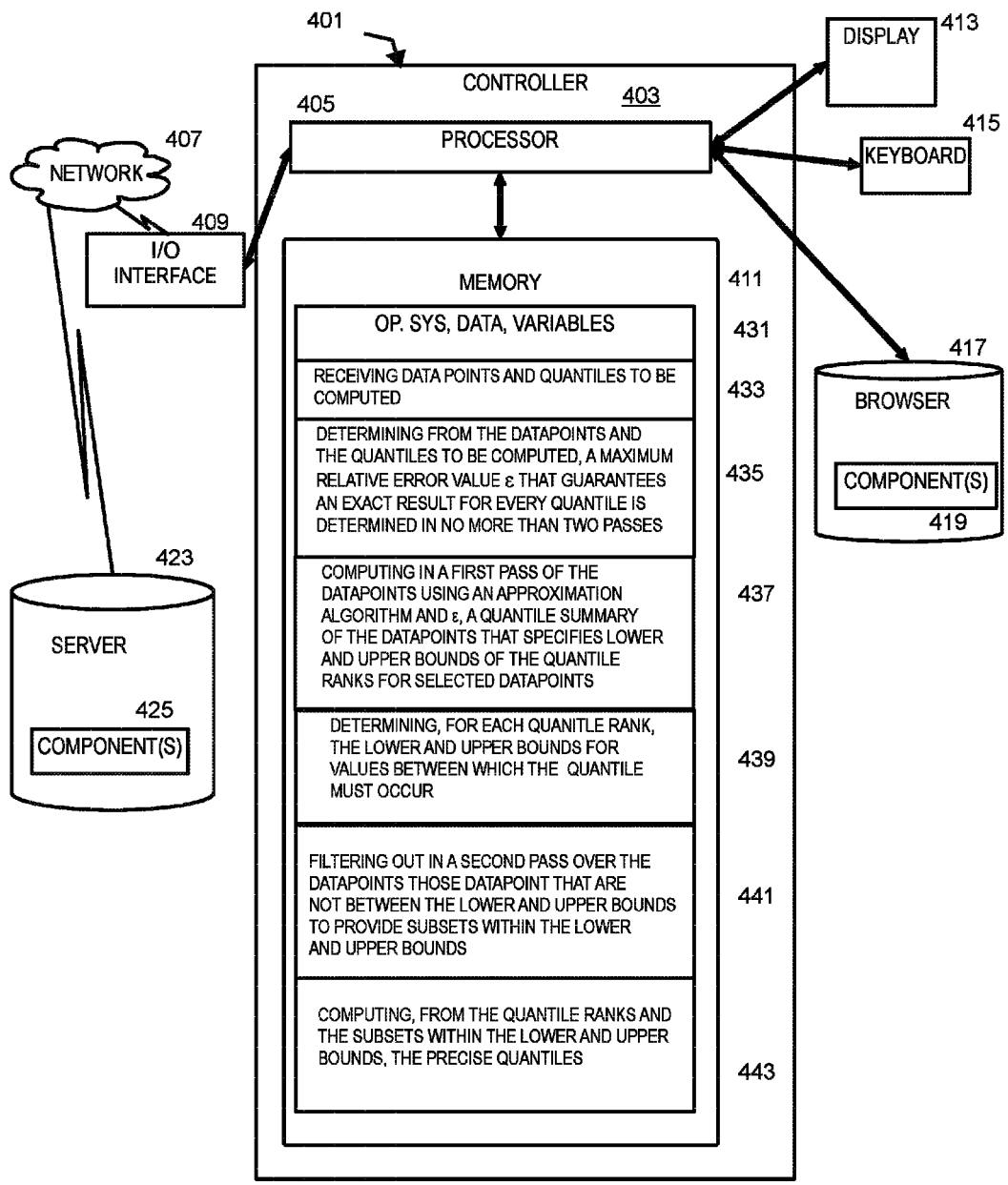
FIG. 4 is a block diagram that depicts relevant portions of a computer system for precise quantile determination in connection with the first embodiment.

FIG. 4 is a block diagram illustrating relevant portions of a computer system 401, on which the precise quantile determination may be implemented. The computer system 401 may include one or more controllers 403, a processor 405, an input/output (i/o) interface 409 for communication such as with a network 407, a memory 411, a display 411 (optional), and/or a user input device (also optional) such as a keyboard 415. Alternatively, or in addition to the keyboard 415, a user input device may comprise one or more of various known input devices, such as a keypad, a computer mouse, a touchpad, a touch screen, and a trackball. The display 413 may present information to the user by way of a conventional liquid crystal display (LCD) or other visual display, and/or by way of a conventional audible device (e.g., a speaker) for playing out audible messages. Portions of the computer system 401 are well understood to those of skill in this area and have been omitted to avoid obscuring the discussion. The processor 405 may comprise one or more microprocessors and/or one or more digital signal processors. The memory 411 may be coupled to the processor 405 and may comprise a read-only memory (ROM), a random-access memory (RAM), a programmable ROM (PROM), and/or an electrically erasable read-only memory (EEPROM). The memory 411 may include multiple memory locations for storing, among other things, an operating system, data and variables 431 for programs executed by the processor 405; computer programs for causing the processor to operate in connection with various functions such as receiving 433 datapoints and quantiles to be computed; determining 435 from the datapoints and the quantiles to be computed, a maximum relative error value ε that guarantees that an exact result for every quantile is determined in no more than two passes; computing 437 in a first pass of the datapoints using an approximation algorithm and ε, a quantile summary of the datapoints that specifies lower and upper bounds of the quantile ranks for selected datapoints; determining 439 for each quantile rank, the lower and upper bounds for values between which the quantile must occur; filtering out 441 in a second pass over the datapoints, those datapoints that are not within the lower and upper bounds to provide subsets within the lower and upper bounds; and computing 443, from the quantile ranks and the subsets within the lower and upper bounds, the precise quantiles. The computer programs may be stored, for example, in ROM or PROM and may direct the processor 405 in controlling the operation of the computer 401. Each of these functions has been considered in extensive detail above.

The user may invoke functions accessible through the user input device such as the keyboard 415. The user input device may comprise one or more of various known input devices, such as a keyboard (415, illustrated) and/or a pointing device, such as a mouse; the keyboard 415 may be supplemented or replaced with a scanner, card reader, or other data input device; and the pointing device may be a mouse, touch pad control device, track ball device, or any other type of pointing device.

Responsive to manual signaling from the user input device represented by the keyboard 415, in accordance with instructions stored in memory 411, and/or automatically upon receipt of certain information via the i/o interface 409, the processor 405 may direct the execution of the stored programs.

The computer 401 can utilize a browser 417, which includes several browser component(s) 419.

The computer 401 can access a server 423 on which is stored one or more components, here represented by server component(s) 425. Although the components 425 are illustrated as accessed over the network 407, the components 425 may be remotely and/or locally accessible from the computer 401, over a wired and/or wireless connection; the components 425 do not need to be limited to a database or a server. Techniques are known for accessing components located in a server 423, and the like.

With regard to the server 423 and browser 417, it may be noted that the computer programs stored in the memory 411 are illustrated on the controller 403. In a client/server embodiment, one or more of the computer programs conveniently may be distributed to the server, such as those marked "SERVER", and one or more of the computer programs conveniently may be distributed to a client side, such as those marked "BROWSER". In such a situation, the server 423 may omit the client computer programs, and the client may omit the server computer programs. In another embodiment, the computer programs may be included on a non-client-server architecture, and the requests between client-servers may be omitted.

As will be understood in this field, besides the functions discussed above, the memory 411 can include other miscellaneous information in a misc. database, not shown, along with the usual temporary storage and other instructions for other programs not considered herein.

The computer 401 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serve as the main information highway interconnecting other components of the computer, and can be connected via an interface to the computer. A disk controller (not illustrated) can interface disk drives to the system bus. These may be internal or external. The processor 405, memory 411, a disk drive and/or removable storage medium are referred to as "computer-readable storage media" and provide non-transitory storage of computer programs and data.

It should be understood that FIG. 4 is described in connection with logical groupings of functions or resources. One or more of these logical groupings may be performed by different components from one or more embodiments. Likewise, functions may be grouped differently, combined, or augmented without parting from the scope. Similarly, the present description may describe or imply various databases or collections of data and information. One or more groupings of the data or information may be omitted, distributed, combined, or augmented, or provided locally and/or remotely without departing from the scope.

V. SECOND EMBODIMENT

A variation involves an extension of the first embodiment, in a situation that the data is distributed among two or more computers. In the first embodiment, it can be possible to obtain precise quantiles with minimal memory on a single computer. Nevertheless, a single computer will have a limited memory capacity and it is possible that a huge data set can only be handled when the data is distributed among two computers, or even among several computers.

This variation concerns a problem of determining exact quantiles from data distributed among several computers while minimizing resource usage. Specifically, there is a problem of how to distribute the calculations among multiple servers, cooperating in parallel, in order to speed up the process while addressing the problem of large memory requirements, particularly when the process is utilized for really huge amounts of collected data. The problem is not solvable in a step-by-step forward approach. Instead, a sequence is provided in which specific parts of the process are distributed and handled among multiple nodes cooperating in parallel, alternating with other specific parts of the process that are executed on a single node. The sequence of the second embodiment elaborates on various aspects of the first embodiment to provide the determination of exact quantiles in a distributed environment.

Figure 5:
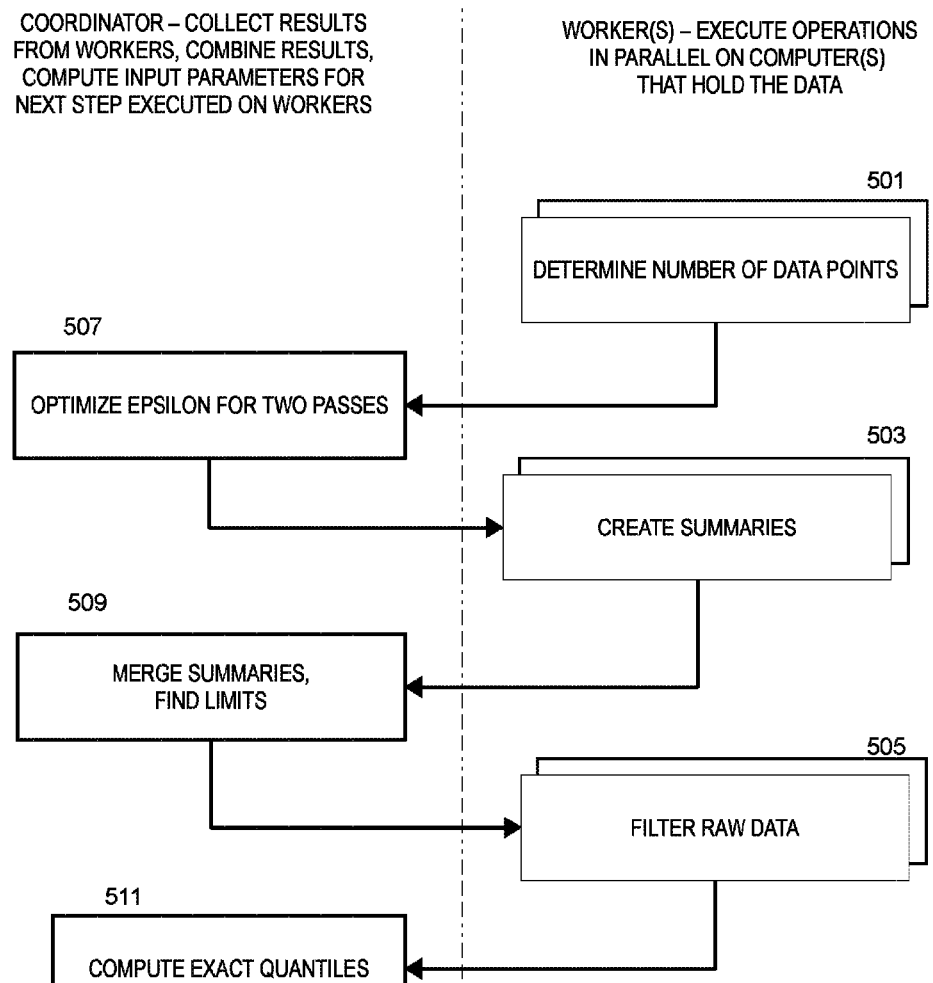
FIG. 5 is a high level diagram illustrating a method for precise quantile determination according to a second embodiment.
Figure 6A:
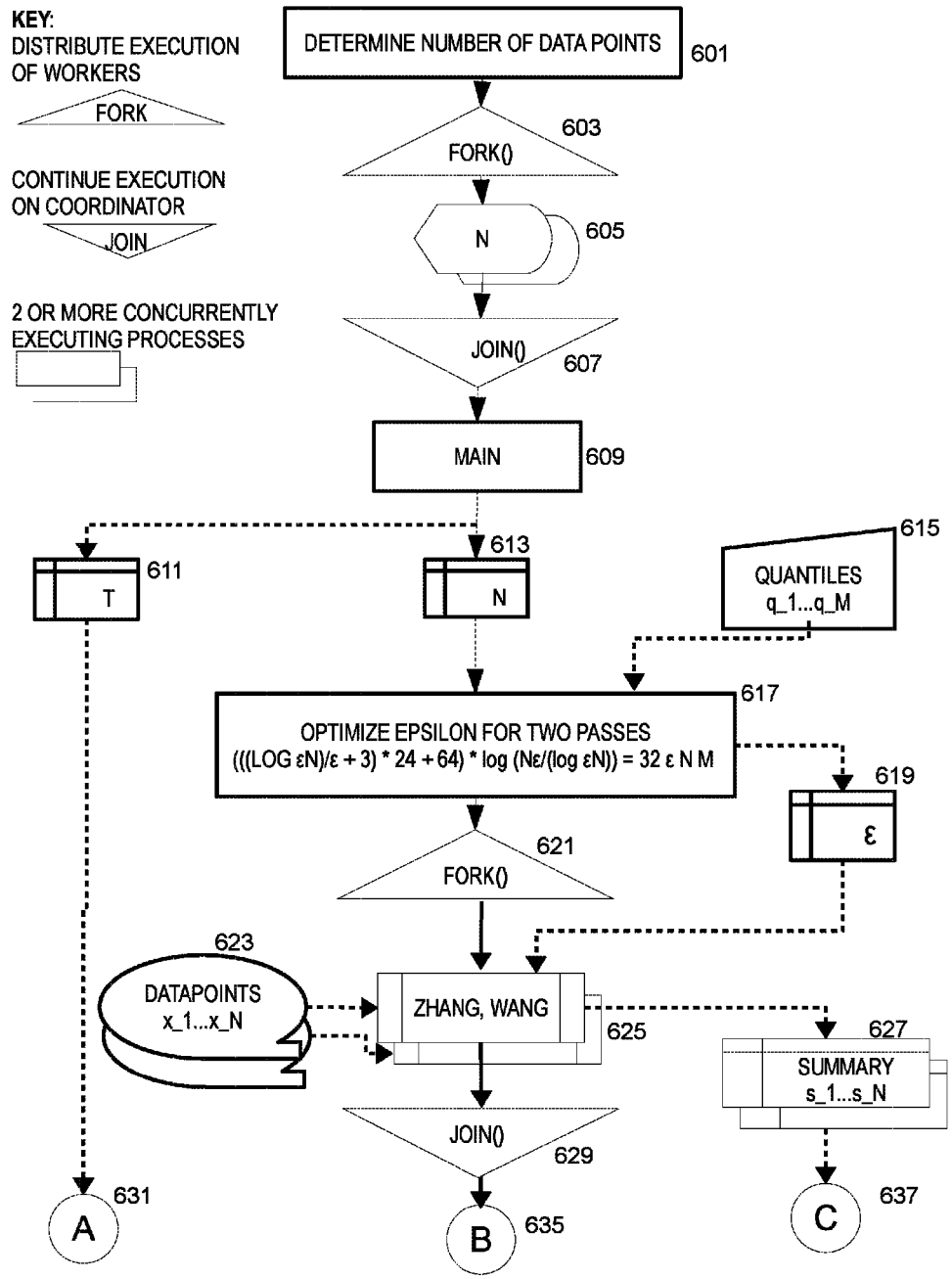
Figure 7A:
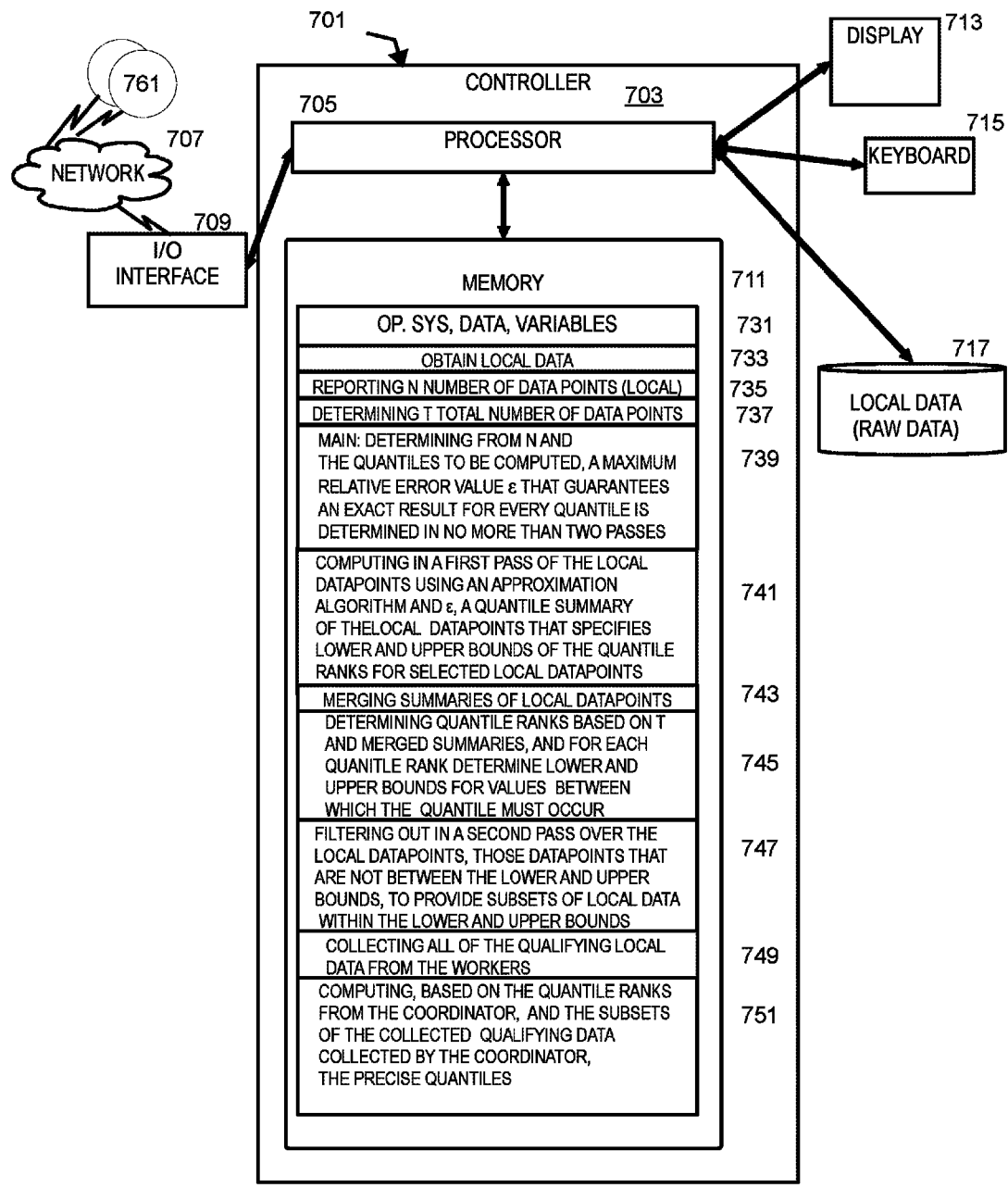
FIG. 7A-7B is a block diagram that depicts relevant portions of distributed computer systems for precise quantile determination according to a second embodiment.
Figure 7B:
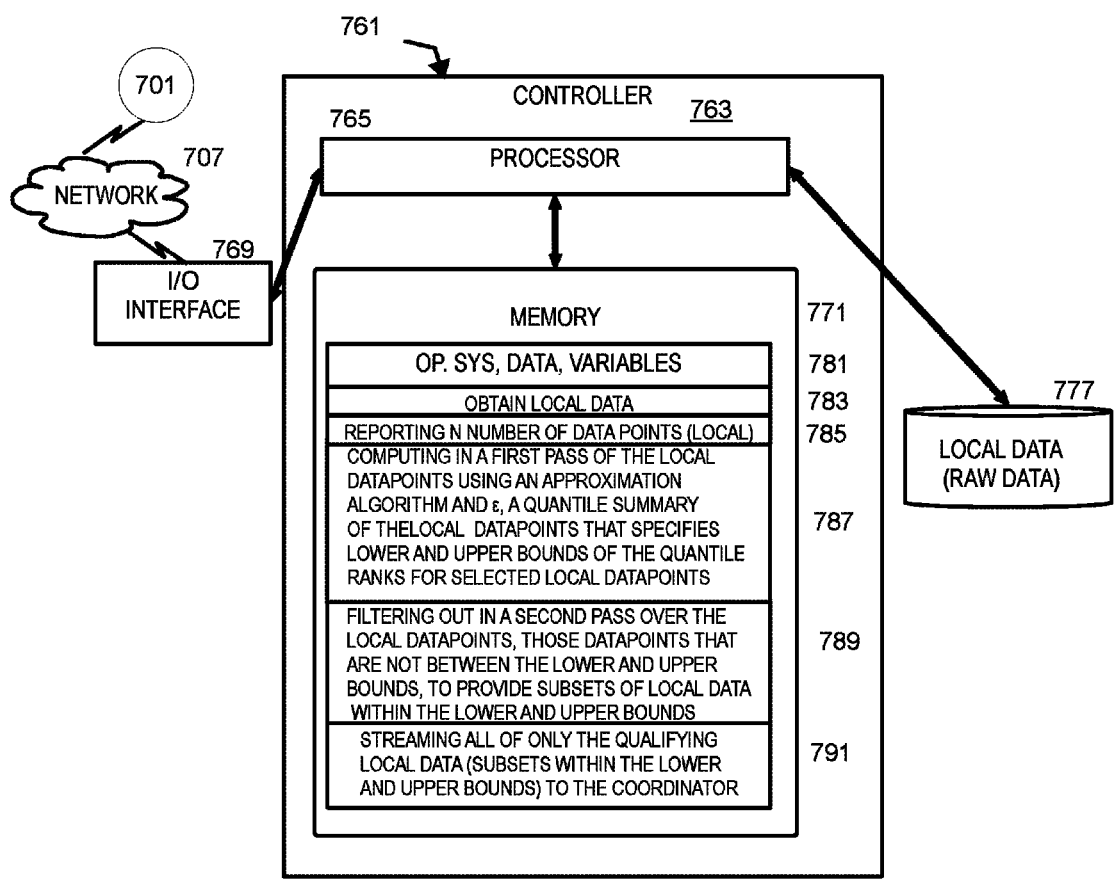

The second embodiment is discussed in connection with FIG. 5, FIGS. 6A-6B and FIGS. 7A-7B. FIG. 5 is a high level diagram illustrating a method for precise quantile determination in a distributed environment, in which operations are executed in parallel on worker computers that hold the data; and a coordinator computer collects the results from the workers, combines the results, and computes the input parameters for the next parallel operations executed on the workers. FIG. 6A-6B (collectively, FIG. 6) is a detailed flowchart illustrating a method for precise quantile determination in a distributed environment, showing when certain steps become distributed to be executed in parallel amongst plural workers and when certain other steps are executed on a single coordinator. FIG. 7A-7B (collectively, FIG. 7) is a block diagram that depicts relevant portions of a distributed computer system for precise quantile determination in the distributed environment.

A. State of the Art of Technology

1. First Embodiment-Overview

Aspects of the first embodiment are now reviewed, prior to discussing a second embodiment. This review is intended to highlight some of the features of the first embodiment, so as to make the second embodiment more understandable. As noted in the first embodiment, the Zhang, Wang algorithm was designed to compute approximate quantiles by means of incrementally building a summary data structure. Zhang and Wang provide proof that the summary data structure can be used at any time to obtain a quantile with a maximum rank error of $\varepsilon$. The maximum error $\varepsilon$ is a parameter to the algorithm that has a direct influence on the amount of memory needed by the data structure.

The first embodiment incorporated the Zhang, Wang algorithm in a method or system for computing exact quantiles with low memory consumption. Assuming the size of the data set is known beforehand, the first embodiment includes two passes over the data as summarized in the following steps:

1. From the number of elements in the data set determine an optimal $\varepsilon$ so that the peak memory consumption is minimized. This is achieved by equating the memory consumption for the summary with the amount of memory needed for the last pass over the data.

2. Using the Zhang, Wang algorithm create an $\varepsilon$-approximate summary of the data in a first pass over the data.

3. Inspect the summary and determine the two values in it whose rank is guaranteed to be above and below the rank of the quantile to be determined, but closest to it. These values are called the 'limits'.

4. In the second pass over the data, collect all those values within the limits, sort them and pick the element in the position corresponding to the rank of the quantile to be determined.

2. Other Work Relevant to Second Embodiment

In 2004, Greenwald and Khanna (M. B. Greenwald and S. Khanna, "Power-conserving computation of order-statistics over sensor networks," in *Symposium on Principles of database systems,* 2004) ("Greenwald II") described a multi-pass algorithm to determine exact quantiles. The algorithm is targeted towards a sensor network, a special form of distributed computing environment. In it they combined an approximate algorithm, published in the same paper, with further processing steps.

U.S. Pat. No. 8,868,573 granted in October 2014 to Y. J. Chu et al., titled "Computing and applying order statistics for data preparation," discloses, among other things, to determine approximate quantiles in a distributed scenario in a single pass while giving exact limits for each of the approximate quantiles. The result is similar to the limits the present inventors obtained from the summaries of the Zhang, Wang algorithm, although the algorithm seems to be quite different.

The Cormode paper (Cormode, Garofalakis, Muthukrishnan, Rastogi, "Holistic aggregates in a networked world—distributed tracking of approximate quantiles", *SIGMOD* 2005, Baltimore) pre-supposes a quantile evaluation scheme at the local nodes of a network, and then discusses how changes to the data distribution might be tracked by updating the quantiles. This is a different concern from the present problem, which deals with fixed data sets.

The Chambers paper (John M. Chambers, David A. James, Diane Lambert and Scott Vander Wiel, "Monitoring Networked Applications With Incremental Quantile Estimation", in *Statistical Science* 2006, Vol. 21, No. 4), presents work on maintaining distributed quantile summaries, but Chambers, too, discuss only computing approximate quantiles, in this case for sliding windows, that is, only for some most recent n of the total N data points. However, it may be possible to adapt the technique to merge multiple distributed ε-approximate summaries into one global ε-approximate summary to our approach. The benefit would be that the global summary could be computed in a more distributed way itself, rather than being constructed exclusively on the coordinator.

Unfortunately, the approximation algorithm of Greenwald II permits using only theoretical limits, not the actual, possibly narrower limits that the Zhang, Wang algorithm yields.

In choosing ε there is a tradeoff between the number of passes and the transmission load in each pass. Choosing a bad ε can lead to higher network traffic and higher memory consumption in the merging summaries. This has already been noted by Greenwald II. However, in contrast to the approach discussed herein, Greenwald II does not give guidelines to finding a good tradeoff.

The Chu patent presents an approximation algorithm only, in comparison to the concern in the present disclosure with computing exact quantiles. The same is true of the Chambers paper (John M. Chambers, David A. James, Diane Lambert and Scott Vander Wiel, "Monitoring Networked Applications With Incremental Quantile Estimation", in *Statistical Science* 2006, Vol. 21, No. 4), which moreover explicitly disregards a constraint that is at the core of our requirements, namely that a quantile must be an observed data value.

B. Concept and Problems Resolved

In order to successfully address a variation of the first embodiment which works well in a distributed environment, several problems needed to be solved.

The diagram of FIG. 5 illustrates, by way of overview, the main steps in the second embodiment, and how the steps are distributed among different computing nodes. The operations in the boxes on the right side of FIG. 5 are executed in parallel on one or more computers that hold the data. These computers are referred to herein as "workers." The operations in the boxes on the left side of FIG. 5 collect the results of the operations performed by workers, combine them and compute the input parameters for the next step to be executed on the workers. These operations are performed by a computer referred to herein as the "coordinator". The coordinator may be a distinct node different from the worker(s); however it is not necessary for the coordinator to be a distinct node; the coordinator can be one of the workers which assumes the role of the coordinator. The contents of the boxes in this high-level diagram are refined below in the sections, which include further discussion, pseudo code and a flow chart.

As illustrated in FIG. 5, each of the workers (which hold the data), in parallel, will determine 501 the number of data points for its own local data. The node with the largest number of data points will continue to function as the coordinator. Each number of data points is provided to the coordinator. Then, the coordinator will optimize 507 epsilon for two passes. Epsilon is provided to each of the workers. Then, each of the workers will, in parallel, create 503 summaries for its own local data. Each summary is provided to the coordinator. Then, the coordinator will merge 509 the summaries, and find the limits based on the merged summaries. The limits (based on the merged summaries) are provided to each of the workers; the same limits are provided to all of the workers. Then, each of the workers will, in parallel, filter 505 its own local data based on the limits, to determine the filtered local data and a count of the elements on or below the lower bound, both of which will be sent to the coordinator. Each of the workers will stream the filtered local data and the count to the coordinator; all of the filtered local data from each of the workers thus is collected at the coordinator, without requiring the raw data or the data which is outside the limits. Then, the coordinator will compute 511 the exact quantiles from the collection of the formerly distributed, filtered data and the counts.

The following describes three of the main problems that were solved in order to arrive at the proposed algorithm. The most difficult one will be described last.

1. How to Determine Limits from Multiple Summaries (Necessary Feature)

When the algorithm is executed on a single computer there is a single summary constructed by the algorithm that we can use. Now we have several summaries. Each of them summarizes only the local part of the data. To find the overall quantile we need to determine the global limits.

One of the steps the Zhang, Wang algorithm is an operation they call 'merge' which combines two summaries into a new one. They cite Greenwald II for proving that two of those approximate summaries can be 'merged' into a new one that has the maximum ε of the two inputs. Building on this proof, the inventors realized that they can combine the summaries from the different workers into one big summary without losing accuracy.

From this big summary, the second embodiment can then determine the limits just as in the first embodiment. The second embodiment will use the same limits for all workers, because it is not known how the values are distributed among the workers.

A person skilled in the art would need to recognize that the merge operation that was applicable to combine summaries that were constructed with an optimal ε on a single computer would also be applicable to combine the completed summaries from the workers, of which some would use a sub-optimal ε.

This is a necessary feature of the invention, because the second embodiment does not work at all without the merging of the results.

2. How to Improve the Efficiency of Obtaining Exact Quantiles in the Last Step (Optional Feature)

In the non-distributed algorithm of the first embodiment, the values within the limits would be collected, sorted and then the quantile value with the desired quantile rank can be looked up in the sorted list of values. A naïve distributed strategy would be to let the workers collect and sort the values, combine the lists on the coordinator into one big sorted list and then look up the quantile value from it.

However, it is neither necessary nor desirable to let the workers store all the values together or to sort them. The memory consumption of the workers in this last step can be greatly reduced if the workers can send ("stream") each of the qualifying values to the collector immediately. This way nothing needs to be stored on the workers in this phase. Only the coordinator needs to store the values, which he would have to do eventually anyway. In addition, it is practical to sort all values at once on the coordinator, too.

A person skilled in the art would need to know both the working of the quantile algorithm and know the concept of streaming from the domain of data transmission over a network.

3. How to Find an Optimal ε (Necessary Feature)

In the original algorithm we chose ε to minimize the peak memory consumption on the single computer that the algorithm was to be executed on. This time we have several computers. Each will have its own memory limitations. It is difficult to say what is optimal in this case as it depends on the goal for the optimization.

3.a. Optimizing Network Usage and Coordinator Memory

If the coordinator is not one of the workers, minimizing the peak memory consumption on the coordinator will also minimize the amount of data sent over the network between the workers and the coordinator (and vice versa).

Let $n_1, \ldots n_k$ be the number of elements in the data sets of the workers $1 \ldots k$. We would have to find an ε that is the solution to the equation $$\Sigma_{i=1}^{k} m_{approx}(n_i, \varepsilon) = \Sigma_{i=1}^{k} m_{exact}(n_i, \varepsilon).$$

Here $m_{approx}$ is the formula for calculating the size of the summary data structure, and $m_{exact}$ is the formula for calculating the amount of memory needed for storing and transmitting the maximum possible number of elements remaining within the limits returned by the ε-approximate algorithm. The formulae for calculating these entities are listed in the first embodiment discussed above in sections I-IV, and repeated here:

$$m_{approx} = (b+3)3dL + hL$$

$$m_{exact} = 4\varepsilon N \, d \, M$$

where L is the number of levels in the summary, b is the block size for partitioning the data into buffers, and M is the number of quantiles sought in the query.

The worst case formulae for L and b have already been provided by Zhang/Wang and been discussed in connection with the first embodiment.

Although not immediately apparent, the only thing that makes sense in the end is for all workers to use the same ε. The reason is that—as described above—the ε of the merged summary in the end is the maximum of the summaries created by the individual workers.

The workers, thus, use a very different ε in this scenario than if they had to compute a local quantile on their data only. Some of them will, in fact, transmit more data than they would if they were using their individual optimal ε. Of course, each worker will send differing amounts of data over the network between the two phases. In contrast to the first embodiment, only in the first pass over the data workers will need considerable amounts of memory, because in the last pass the collected values are not stored on the worker, but instead directly streamed to the coordinator.

3.b. Optimizing Worker Memory

It is not possible to optimize all workers at once. However, one can choose one of the workers and optimize its memory consumption. It is practical to choose the worker with the most data to process, for it will use the most temporary memory during the query.

The other workers will use more memory than they would have if each of them had to determine the quantile on its data alone. Nevertheless, each of the other workers will use less memory than the worker with the most data, because they all use the same ε and only n differs.

Because the values collected in the last pass are streamed to the coordinator, the memory consumption of the workers solely depends on the memory needed in the first pass. That, in turn, directly depends on the value of ε. One could choose a huge epsilon so as to minimize the memory consumption in the first pass, but this would invariably lead to a huge amount of data being transferred in the last pass. Therefore an implementation should balance the two goals.

3.c. Worker as Coordinator

Of the operations discussed herein, data transmission is typically the most expensive operation. Network resources tend to be more limited than memory or CPU power on a single computer, and network transmission is also extremely time-consuming. For this reason, it can be important to minimize the amount of data transmitted over a network.

If one of the workers acts as the coordinator it may be practical to choose the one that would have to transmit the most data, as this data then does not need to be transmitted. That worker is the one with the most data to process.

3.d. Synthesis (Preferred Embodiment)

The preferred embodiment would select one of the workers as the coordinator, advantageously the worker that holds the biggest share of the relevant data. The bigger the share is comparatively, the better the savings in the volume of data transmission.

The data transmission can be further reduced by choosing ε based only on the remaining workers and ignoring the worker acting as the coordinator. However, doing so can lead to huge memory consumption in certain cases, such as when the number of relevant data points stored on the coordinator is much larger than the number of data points on any of the ordinary workers.

Accordingly, accepting data transmission volumes that are a bit higher than the theoretical minimum can be more practical in these cases. Consequently, the inventors favor choosing an ε that optimizes the memory consumption of the worker that is selected as the coordinator. This is the same ε that would be used in connection with embodiment 1 if it was running only on the data of this worker.

A person skilled in the art would have needed to realize the issues involved in balancing memory consumption and transmission volume in light of the formulae devised above.

C. Implementation

A preferred way to carry out the invention is now discussed, referring to the flow chart of FIGS. 6A and 6B, and the following pseudo code. (It will be noted that A, B and C 631, 635, 637 are connectors between the flow of FIG. 6A and FIG. 6B, which may be collectively referred to as FIG. 6.) This discussion also refers to processing steps that have already been described in the first embodiment and accordingly, which are not spelled out in detail in this section.

Step 1. The flow begins by processing 601 on an arbitrary machine with the procedure determine number of datapoints. In this procedure, the arbitrary machine forks 603 the processing to the workers to report the number of data points that reside on each of them; for example, the arbitrary machine broadcasts a message to all workers. Each of the workers (which are concurrently executing) reports 605 the number N, which can be a different number for each worker and is the total number of datapoints 613 that resides on that worker. Processing joins 607 back to the arbitrary machine, which adds the reported numbers N of datapoints 613 to determine the total number T of datapoints 611 over which quantiles are to be determined. In addition, the maximum of these numbers is found (it may be convenient to perform this, by way of example without limitation, by sorting) and any worker that has reported this maximum number can be selected as the coordinator. A message is sent 607 by the arbitrary machine to the selected worker to start coordinating the quantile determination.

Step 2. The selected coordinator then begins processing with the main method 609. The main method 609 knows the reported numbers N of datapoints 613 and the total number T of datapoints 611 over which quantiles are to be determined, as reported by the arbitrary machine. From the size of the local input and the number of quantiles to be computed, the coordinator derives 617 a value for ε that guarantees that an exact result for every quantile can be found in at most two passes with optimal memory consumption on the coordinator. This has been described in detail in connection with the first embodiment.

Step 3. On the coordinator, an implementation of the Zhang, Wang algorithm is employed 625 to compute a summary of the input datapoints 623 (for the datapoints that reside on the coordinator) that specifies lower and upper bounds for the ranks each input element can possibly occupy. The algorithm is given in Zhang and Wang's paper. Note that Step 3 can be incorporated into Step 4 rather than being its own step, since the coordinator can be regarded as just one of the workers.

Step 4. Furthermore, the coordinator can fork processing 621 causing processing to be distributed to all workers, optionally including itself as mentioned in the previous paragraph (for example, by broadcasting a message to all workers) which causes the workers to employ an implementation of the Zhang-Wang algorithm 625 for their respective datapoints 623, and to send the resulting summary 627 back to the coordinator. The construction of these respective summaries 627 in step 3 and step 4 takes place concurrently and independently on each worker.

Step 5. The distributed processing is then joined 629 back at the coordinator. The coordinator can collect the summaries that are contained in or otherwise made available by the return messages from the workers, and can merge 651 them into a constructed summary; because the constructed summary is constructed from the respective summaries from each of the workers (without needing all of the datapoints), the constructed summary can be constructed locally at the coordinator. An appropriate MERGE function is described in the Zhang, Wang paper.

Step 6. For each quantile, the coordinator can determine 653 the ranks of the requested quantiles and compute 659 the limits, that is, lower and upper bounds for the values between which an element of each quantile's rank must occur, as in the first embodiment.

Step 7. The coordinator can filter 667 the local input from its datapoints 623 to collect all elements that lie between the limits, as disclosed above in connection with the first embodiment, to collect its own qualifying local data. Note that Step 7 can be incorporated into Step 8 rather than being its own step, since the coordinator can be regarded as just one of the workers.

Step 8. Also, the coordinator can broadcast 661 a message to all of the workers to cause each of the workers, optionally including itself as mentioned in the previous paragraph, to filter 667 their local inputs from their respective datapoints 623 in the same way, to collect all elements that lie between the limits. (Note that for convenient discussion, the illustration of datapoints 623 is repeated in FIG. 6A and FIG. 6B.)

Step 9. Each worker sends 671 their local inputs from the filtering which lie between the limits, as the qualifying local data, to the coordinator. For example, the qualifying local data can be streamed directly to the coordinator in accordance with known techniques for streaming. In addition, each worker counts the number of the local elements on or below the lower boundary and sends it to the coordinator after it has processed all its local data.

Step 10. The coordinator collects 673 all of the qualifying local data which is sent to it from the workers. The coordinator adds the qualifying local data, which it receives from the workers, to its own qualifying local data. The collection of qualifying data from the workers (including the coordinator) can be considered the overall qualifying data, sometimes referred to herein as the collected qualifying data. The coordinator also calculates the overall number of elements on or below the lower bound by adding up the individual counts.

Step 11. The coordinator then can compute 675 the exact quantiles on the collected qualifying data; computing the exact quantiles has been discussed above in detail in connection with the first embodiment. The coordinator can provide the quantile values 677 which have been computed by the exact search.

D. Figures and Illustration

1. Example

The following extends the example provided in connection with the first embodiment. A very small data set is used for convenience of discussion, and assume ε=0.2 for demonstrational purposes. Note, this small data set is used for the purpose of illustration and is merely representational of a data set, which can be huge.

Assume that the data is distributed among two workers as follows:

Worker #1: 9, 12, 17, 3, 1, 4, 2, 21, 11, 16, 13, 20, 15, 14, 5, 7, 8, 6, 19, 10, 18

Worker #2: 27, 4, 11, 6, 28, 19, 22, 8, 23, 25, 24

Note that worker #1 has the same data as was used in the example of the first embodiment. Worker #1 uses block size b=10. In Table 1 of the first embodiment, the result of the Zhang, Wang algorithm is demonstrated for this input.

Worker #2 has fewer values and therefore uses a smaller block size b=5. The execution of the Zhang, Wang algorithm on worker #2 is visualized in Table 4, below.

The results from worker #1 and #2 are then merged:

Input #1 (result from worker #1): $_1 1_1, _6 7_7, _{10} 10_{11}, _{14} 14_{15}, _{15} 18_{20}, _{21} 21_{21}$ Input #2 (result from worker #2): $_1 4_1, _4 19_5, _5 24_8, _8 25_9, _{11} 28_{11}$ Merge result: $_1 1_1, _2 4_7, _7 7_{11}, _{11} 10_{15}, _{15} 14_{19}, _{16} 18_{24}, _{19} 19_{25}, _{25} 21_{29}, _{26} 24_{29}, _{29} 25_{30}, _{32} 28_{32}$ Assume we want to find the median (quantile rank 0.5). In analogy to the first embodiment, the quantile rank is multiplied with the number of elements in the input: 0.5×32=16. Thus the rank of the element that the process seeks must be R=16.

Therefore the process scans the Merge of the root summaries for a lower bound element (L) and an upper bound element (H). Reminder: L is the largest element with a guaranteed maximum rank (strictly) less than R. H is the smallest element with a guaranteed minimum rank strictly greater than R. The process arrives at L=10 and H=19.

In the second pass over the input, the process counts all elements that are smaller than or equal to L, collects elements between L and H and discards all elements equal to or larger than H.

The process then goes on to collect all qualifying values on the different workers while counting those values smaller or equal to L. The collected values are then sorted into one list on the coordinator. In this example, the total number of values smaller or equal to L=10 is Offset=13 and the unsorted list looks like this: 12, 17, 11, 16, 13, 15, 14, 18, 11.

After sorting the values into 11, 11, 12, 13, 14, 15, 16, 17, 18, the process seeks the element at position R'=R−Offset=16−13=3 and finds the median to be 12.

The results can be cross checked by looking at the sorted input (1, 2, 3, 4, 4, 5, 6, 6, 7, 8, 8, 9, 10, 11, 11, 12, 13, 14, 15, 16, 17, 18, 19, 20, 21, 22, 23, 24, 25, 27, 28) and picking the value in the 16$^{th}$ position: 12. The cross check confirms that the result determined by the process is correct.

TABLE 4

Example of Zhang, Wang Algorithm on Worker #2

| Input | Action | Temporary Storage | Summary Level 0 | Summary Level 1 | Summary Level 2 |
|---|---|---|---|---|---|
| 27 | | | 27 | | |
| 4, 11, 6 | (abbreviated) | 27, 4, 11, 6 | | | |
| 28 | Sort level 0 | 4, 6, 11, 27, 28 | | | |
| | COMPRESS with $\varepsilon = 1/b$ | $_14_1, {}_26_2, {}_427_4, {}_528_5$ | | | |
| | Send to level 1 | | | $_14_1, {}_26_2, {}_427_4, {}_528_5$ | |
| 19, 22, 8, 23 | (abbreviated) | | 19, 22, 8, 23 | $_14_1, {}_26_2, {}_427_4, {}_528_5$ | |
| 25 | Sort level 0 | 8, 19, 22, 23, 25 | | $_14_1, {}_26_2, {}_427_4, {}_528_5$ | |
| | COMPRESS with $\varepsilon = 1/b$ | $_18_1, {}_219_2, {}_423_4, {}_525_5$ | | $_14_1, {}_26_2, {}_427_4, {}_528_5$ | |
| | MERGE with level 1 | $_14_1, {}_26_2, {}_38_4, {}_419_5, {}_623_7, {}_725_8, {}_927_9, {}_{10}28_{10}$ | | | |
| | COMPRESS with $\varepsilon = 2/b$ | $_14_1, {}_419_5, {}_725_8, {}_{10}28_{10}$ | | | |
| | Send to level 2 | | | | $_14_1, {}_419_5, {}_725_8, {}_{10}28_{10}$ |
| 24 | | | 24 | | |
| | MERGE all levels | $_14_1, {}_419_5, {}_524_8, {}_825_9, {}_{11}28_{11}$ | | | |

2. Pseudo Code

All methods not defined here can be implemented exactly as in the first embodiment, with the exception that the input is not passed over the network, but known locally on each worker. Each worker can be assumed to have a unique numeric identifier. The (possibly remote) invocation of a procedure p on worker X can be written Worker.X.p. The processing can start with the procedure find_coordinator, although in the following there is a procedure called main, called so for historic reasons: it is the analog of the correspondingly named procedure in the first embodiment. The data type definitions for rank, summary, subset, limit and the implementations of all invoked procedures are also given in the first embodiment discussed above.

| Listing - Pseudo Code |
|---|
| ```
record worker_data                         number of data points on a worker
    worker : integer
    datapoints : integer
procedure find coordinator(Query : quantile[ ])
    var W := number of workers
    var D : worker_data[ ]
    for I from 1 to W do in parallel
        D[I] := Worker.I.determine number of data points
    end
    sort(D) by datapoints descending
    var Coordinator := D[1]
    var T : integer                        total number of data points
    for I from 1 to W do
        T := T + D[I].datapoints
    end
    Coordinator.main(Query, T, W)
end
procedure main(Query : quantile[ ], T : integer, W : integer)
    var N := number of data points         data points on this node
    var M := length of Query
    var Ranks : rank[ ]
    for I from 1 to M do
        Ranks[I] := floor(Query[I] * T) + 1    each quantile's rank
    end
    var Eps := optimize epsilon for two passes(N, M)   optimized for local data
    var Sw : summary[ ]
    for I from 1 to W do in parallel
        Sw[I] := Worker.I.zhang wang(Eps)      1st pass over local input on workers
    end
    var Summary : summary
    Summary := Sw[1]
    for I from 2 to W do
        Summary := MERGE(Summary,Sw[I])    the MERGE step in Zhang/Wang's paper
    end
    var Limits := find limits(Summary, Ranks)
    var Subs : subset[ ][ ]
    for I from 1 to W do in parallel       stream all worker data to coordinator
        collect into Subs stream of Worker.I.filter input(Limits)
    end
    var Master : subset[ ]
    for I from 1 to W do
        Master[I] := combine subsets(Master, Subs[I], M)
    end
    var Quantiles := exact search(N, Master, Ranks)
    output Quantiles
end
``` |

The follow procedure combines, for each requested quantile, a subset of input elements that could be that quantile into a constructed master subset. The data points are collected in a single set, the offset corrected accordingly, and the limits taken over unchanged because they originate from the coordinator node anyway.

```
procedure combine subsets(Master : subset[ ], S : subset[ ], R : int)
    for I from 1 to R do
        Master[I].sub := union(Master[I].sub, S[I].sub)
        Master[I].offset := Master[I].offset + S[I].offset
        Master[I].limit := S[I].limit
    end
end
```

3. Flow Charts

The flow chart of FIG. 6A-6B, previously discussed, illustrate the flow of data and control for the above pseudo code. The second embodiment introduces new notation for distributed flows, labelled fork and join respectively, where the components that are being executed concurrently on the workers are indicated by "shadowing" in FIG. 6.

The procedure in the flow chart of FIG. 6A-6B can advantageously be implemented on, for example, processors of a coordinator and workers in a distributed environment, described in connection with FIG. 7A-7B, or other apparatus appropriately arranged.

4. Distributed Computer System Implementation Example

FIG. 7A-7B is a block diagram illustrating relevant portions of distributed computer systems 701, 761 for precise quantile determination, on which the precise quantile determination may be implemented. FIG. 7A illustrates a coordinator computer system and FIG. 7B illustrates a worker computer system. As shown in FIG. 7A, the coordinator computer system 701 may include one or more controllers 703, a processor 705, an input/output (i/o) interface 709 for communication such as with a network 707, a memory 711, a display 713 (optional), and/or a user input device (also optional) such as a keyboard 715. Portions of the computer system 701 are well understood to those of skill in this area. The processor 705 may comprise one or more microprocessors and/or one or more digital signal processors. The memory 711 may be coupled to the processor 705 and may comprise a read-only memory (ROM), a random-access memory (RAM), a programmable ROM (PROM), and/or an electrically erasable read-only memory (EEPROM). The processor 705 can obtain local data from a local data storage 717; the local data has not been massaged according to the techniques discussed herein. The other processors in the distributed system (such as in workers 761) also have their own local data storage 777 for their respective data, which will be different among the nodes of the distributed system. The memory 711 may include multiple memory locations for storing, among other things, an operating system, data and variables 731 for programs executed by the processor 705; computer programs for causing the processor to operate in connection with various functions such as obtaining 733 local data, reporting 735 N number of data points (local), determining T total number of data points for the entire distributed system, performing a "main" process 739; determining 739 from N and the quantiles to be computed, a maximum relative error value ε that guarantees that an exact result for every quantile is determined in no more than two passes; computing 741 in a first pass of the local datapoints using an approximation algorithm and ε, a quantile summary of the local datapoints that specifies lower and upper bounds of the quantile ranks for selected datapoints; merging 743 the summaries of the local data points; determining 745 for each quantile rank, based on T total number of data points and the merged quantile summaries, the lower and upper bounds for values between which the quantile must occur; filtering out 747 in a second pass over the local datapoints, those local datapoints that are not within the lower and upper bounds to provide subsets of local data within the lower and upper bounds; collecting 749 all of the qualifying local data from the workers; and computing 751, based on the quantile ranks from the coordinator, and the collected qualifying data collected by the coordinator (from the subsets within the lower and upper bounds from the workers), the precise quantiles. Note that the precise quantiles can be output for further use, for example, to summarize what data is stored and how it is distributed, and other use of quantiles as would be well understood to one of skill in this art.

It should be noted that the coordinator computer system example of FIG. 7A includes functions of the worker computer system. In some embodiments, the coordinator computer system can omit functions of the worker computer system, i.e., the local data storage 717, reporting 735 N number of local data points, the first pass 741, and the second pass 747.

FIG. 7A illustrates that the coordinator computer system 701 communicates with at least one worker computer system 761, here shown as two worker computer systems which is representative of any number of worker computer systems. In FIG. 7, the communication is via the network 707; note that the coordinator computer system 701 and one or more of the worker computer systems 761 can be in communication via a direct connection.

As shown in FIG. 7B, the worker computer system 761 may include one or more controllers 763, a processor 765, an input/output (i/o) interface 769 for communication such as with the network 707, a memory 771. Portions of the computer system 701 and peripherals are well understood to those of skill in this area and thus are omitted from this discussion. The processor 765 may comprise one or more microprocessors and/or one or more digital signal processors. The memory 771 may be coupled to the processor 765 and may comprise a read-only memory (ROM), a random-access memory (RAM), a programmable ROM (PROM), and/or an electrically erasable read-only memory (EEPROM). The memory 771 may include multiple memory locations for storing, among other things, an operating system, data and variables 781 for programs executed by the processor 765; computer programs for causing the processor to operate in connection with various functions such as obtaining 781 local data, reporting 783 N number of data points (local); computing 787 in a first pass of the local datapoints using an approximation algorithm and ε, a quantile summary of the local datapoints that specifies lower and upper bounds of the quantile ranks for selected datapoints; filtering out 789 in a second pass over the local datapoints, those local datapoints that are not within the lower and upper bounds to provide subsets of local data within the lower and upper bounds; and streaming 791 all of only the qualifying local data to the coordinator.

The computer programs discussed above may be stored, for example, in ROM or PROM and may direct the respective processor 705, 765 in controlling the operation of the respective computer 701, 761. Each of these functions has been considered in extensive detail above. Responsive to manual signaling from the user input device represented by the keyboard 715, in accordance with instructions stored in memory 711, 771, and/or automatically upon receipt of certain information via the i/o interface 709, 769, the processor 705, 765 may direct the execution of the stored programs.

As will be understood in this field, besides the functions discussed above, the memory 711, 771 can include other miscellaneous information in a misc. database, not shown, along with the usual temporary storage and other instructions for other programs not considered herein.

The computer 701, 761 can accommodate one or more disk drives or removable storage (not illustrated), such as those discussed in connection with FIG. 4. The processor 704, 765, memory 711, 771, disk drive and/or removable storage medium are referred to as "computer-readable storage media" and provide non-transitory storage of computer programs and data.

It should be understood that FIG. 7 is described in connection with logical groupings of functions or resources. One or more of these logical groupings may be performed by different components from one or more embodiments. Likewise, functions may be grouped differently, combined, or augmented without parting from the scope. Similarly, the present description may describe or imply various databases or collections of data and information. One or more groupings of the data or information may be omitted, distributed, combined, or augmented, or provided locally and/or remotely without departing from the scope, provided that the distributed environment of the second embodiment is distributed as discussed herein.

VI. GLOSSARY

Terms as used herein are intended to be interpreted as understood to one of skill in the art of statistical analysis using quantile determination instead of as interpreted by a more general dictionary.

The claims may use the following terms, which are defined to have the following meanings for the purpose of the claims herein. Other definitions may be specified in this document.

The term "computer system" or "computer" used herein denotes a device sometimes referred to as a computer, laptop, personal computer, tablet computer, handheld computer, smart phone, personal digital assistant, notebook computer, personal assignment pad, server, client, mainframe computer, minicomputer, or evolutions and equivalents thereof.

The term "quantile" is used herein to denote one of the following:
  (1) The element that divides a given set of values into two parts where all elements in the first part are less than or equal to any element in the second part. The number of elements in the first part is equal to a given fraction $\phi$ of the total set.
  (2) The fraction $\phi$.

The term "quantile rank" is used herein to denote the fraction $\phi$ as used in the aforementioned definition of "quantile."

The term "rank" is used herein to denote a number specifying a position in a numerically ordered series.

The phrase "automatically without manual intervention," when used in a claim, is defined to mean that the particular step occurs after the step is initiated until limitations recited in the step are finished without requiring a user to provide input to a processor.

VII. IMPLEMENTATIONS AND TECHNICAL NOTES

The above discussion has assumed that the reader has a sufficient background for appreciating the points made. This section provides some implementation and/or technical notes which discuss some basic technical information that may be relevant to the above.

This discussion has involved particular examples. However, the principles may be applied to other examples and/or realizations. Naturally, the relevant data may differ, as appropriate. Further, an embodiment has been discussed in certain examples as if it is made available by a provider to a single customer with a single site. An embodiment may be used by numerous users, if preferred, for example, over distributed systems.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments that demonstrate a method and/or system for precise quantile determination have been discussed in detail above. It should be further noted that the above-described processes can be stored as instructions in computer-readable storage medium. When the instructions are executed by a computer, for example after being loaded from a computer-readable storage medium, the process(es) are performed.

The detailed descriptions, which appear herein, may be presented in terms of program procedures executed on a computer or a network of computers. These procedural descriptions and representations herein are the means used by those skilled in the art to most effectively convey the substance of their work to others skilled in the art.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The system used in connection herewith may (or may not) rely on the integration of various components including, as appropriate and/or if desired, by way of example but not limitation, hardware and software servers, applications software, database engines, server area networks, firewall and SSL security, production back-up systems, and/or applications interface software. An embodiment may be, by way of example but not by way of limitation, network-based and may (or may not) utilize a network such as the Internet or other network as an exemplary interface with the user for information delivery.

One or more databases implicated by the above discussion may be, by way of example but not limitation, in a relational database format, but other standard data formats may also be used. Optionally, the various databases may include a known conversion system capable of receiving data in various standard formats.

One or more displays for the system may be developed in connection with, by way of example but not limitation, HTML display format. Although HTML may be a preferred display format, it is possible to utilize alternative display formats for interacting with a user and obtaining user instructions.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for precise quantile determination in a system in which data is distributed among nodes in the system, one of a plurality of worker nodes functions as a coordinator node, each of the worker nodes having local data for the precise quantile determination, the method comprising:
    by each processor in parallel at each of the worker nodes, determining a number N of datapoints to be computed from the local data of the worker node;
    by one of the processors at one of the nodes, selecting as the coordinator node one of the nodes with a largest number of datapoints;
    by a processor at the coordinator node, determining from the number N of datapoints and one or more quantiles to be computed, a maximum relative error value c so that a rank distance between two adjacent elements in all of the one or more quantiles is at most 2ε, wherein the maximum relative error value c guarantees that an exact result for every quantile is determined in two passes, wherein the value for the maximum relative error ε is determined by solving the following equations:

$M_{approx} = (b+3)3dL + hL$ $M_{exact} = 4\varepsilon N\, d\, M$ $M_{approx} = M_{exact}$, such that $M_{approx}$ and $M_{exact}$ are memory consumptions, M is the number of requested quantiles, b is a block size for partitioning input buffers, d is memory per entry, L is a number of levels in the quantile summary, h is additional overhead for pointers that connect the levels in the quantile summary, and N is an amount of the datapoints;
    by each processor in parallel at each of the worker nodes, computing, in a first pass of the datapoints of the local data of each of the worker nodes, using an approximation algorithm and the maximum relative error value ε, a quantile summary of the datapoints of the local data that specifies local lower and upper bounds of the quantile ranks for selected datapoints of the local data of each of the worker nodes;
    by the processor at the coordinator node:
        merging the quantile summaries for the datapoints of the local data of each of the worker nodes, into a constructed summary;
        determining, based on the constructed summary, for each quantile rank, second-pass lower and upper bounds for values between which the quantile must occur;
    by each processor in parallel at each of the worker nodes, filtering out, in a second pass over the datapoints of the local data at each of the worker nodes, the datapoints that are not between the second-pass lower and upper bounds determined at the coordinator node based on the constructed summary which is based on all of the plurality of worker nodes, to provide subsets of datapoints of the local data at the worker node which are within the second-pass lower and upper bounds from the coordinator node;
    by the processor at the coordinator node:
        collecting, from the worker nodes, as collected qualifying data, all of the subsets of datapoints of the local data from the worker nodes which is within the second-pass lower and upper bounds determined at the coordinator node; and
        computing, based on the quantile ranks and the collected qualifying data which were collected from the worker nodes, the precise quantiles.

2. The method of claim 1, further comprising streaming, by the worker nodes, the subsets of datapoints of the local data within the lower and upper bounds, to the coordinator node.

3. The method of claim 1, wherein when the lower and upper bounds for all quantiles are identical, then the precise quantile determination is complete.

4. The method of claim 1, wherein
    the filtering out step further comprises, by each processor in parallel at each of the worker nodes:
        collecting the datapoints that lie between the lower and upper bounds;
        counting/excluding the datapoints that are on or below the lower bound; and
    the collecting and the computing by the coordinator node further comprises:
        sorting the datapoints that lie between the lower and upper bounds;
        selecting a datapoint of a requested rank from the sorted datapoints; and
        simultaneously correcting the requested rank by the number of datapoints on or below the lower bound.

5. A system for precise quantile determination in which data is distributed among nodes in the system, one of a plurality of worker nodes functions as a coordinator node, each of the worker nodes having local data for the precise quantile determination comprising:
    a coordinator node having
        a memory; and
        a processor cooperatively operable with the memory; and
    a plurality of worker nodes, each worker node having
        a memory; and
        a processor cooperatively operable with the memory,
    the processor of the coordinator node is configured to, based on instructions stored in the memory of the coordinator node, determine from the number N of datapoints reported from the worker nodes and one or more quantiles to be computed, a maximum relative error value ε so that a rank distance between two adjacent elements in all of the one or more quantiles is at most 2ε, wherein the maximum relative error value ε guarantees that an exact result for every quantile is determined in two passes, wherein the value for the maximum relative error ε is determined by solving the following equations:

$$M_{approx}=(b+3)3dL+hL$$

$$M_{exact}=4\varepsilon N\,d\,M$$

$$M_{approx}=M_{exact},$$

such that $M_{approx}$ and $M_{exact}$ are memory consumptions, M is the number of requested quantiles, b is a block size for partitioning input buffers, d is memory per entry, L is a number of levels in the quantile summary, h is additional overhead for pointers that connect the levels in the quantile summary, and N is an amount of datapoints;

each processor of each of the worker nodes is configured to operate in parallel with the other worker nodes, and, based on instructions stored in the memory of the worker node, compute, in a first pass of the datapoints of the local data of each of the worker nodes, using an approximation algorithm and the maximum relative error value ε, a quantile summary of the datapoints of the local data that specifies local lower and upper bounds of the quantile ranks for selected datapoints of the local data of each of the worker nodes, the processor at the coordinator node is further configured to merge the quantile summaries for the datapoints of the local data of each of the worker nodes, into a constructed summary;

determine, based on the constructed summary, for each quantile rank, second-pass lower and upper bounds for values between which the quantile must occur;

each processor of each of the worker nodes is further configured to filter out, in a second pass over the datapoints of the local data at each of the worker nodes, the datapoints that are not between the second-pass lower and upper bounds determined at the coordinator node based on the constructed summary which is based on all of the plurality of worker nodes, to provide subsets of datapoints of the local data at the worker node which are within the second-pass lower and upper bounds from the coordinator node;

the processor at the coordinator node is further configured to collect, from the worker nodes, as collected qualifying data, all of the subsets of datapoints of the local data from the worker nodes which is within the second-pass lower and upper bounds determined at the coordinator node; and compute, based on the quantile ranks and the collected qualifying data which were collected from the worker nodes, the precise quantiles.

6. The system of claim 5, wherein the processor of each of the worker nodes is further configured to stream the subsets of datapoints of the local data within the lower and upper bounds, to the coordinator node.

7. The system of claim 5, wherein when the lower and upper bounds for all quantiles are identical, then the precise quantile determination is complete.

8. The system of claim 5, wherein the processor at the worker nodes filters out from the datapoints those datapoints that are not between the lower and upper bounds by:

collecting the datapoints that lie between the lower and upper bounds;

counting/excluding the datapoints that are on or below the lower bound;

sorting the datapoints that lie between the lower and upper bounds;

selecting a datapoint of a requested rank from the sorted datapoints; and simultaneously correcting the requested rank by the number of datapoints on or below the lower bound.

9. A non-transitory computer readable medium comprising executable instructions for a method for precise quantile determination in a system in which data is distributed among nodes in the system, one of a plurality of worker nodes functions as a coordinator node, each of the worker nodes having local data for the precise quantile determination, the instructions being executed on a processor to:

determine, by each processor in parallel at each of the worker nodes, a number N of datapoints to be computed from local data of each worker node;

select, by one of the processors at one of the nodes, as the coordinator node, one of the nodes with a largest number of datapoints;

determine, by a processor at the coordinator node, from the number N of datapoints and one or more quantiles to be computed, a maximum relative error value ε so that a rank distance between two adjacent elements in all of the one or more quantiles is at most 2ε, wherein the maximum relative error value ε guarantees that an exact result for every quantile is determined in two passes, wherein the instructions are further executed so that the value for the maximum relative error ε is determined by solving the following equations:

$$M_{approx}=(b+3)3dL+hL$$

$$M_{exact}=4\varepsilon N\,d\,M$$

$$M_{approx}=M_{exact},$$

such that $M_{approx}$ and $M_{exact}$ are memory consumptions, M is the number of requested quantiles, b is a block size for partitioning input buffers, d is memory per entry, L is a number of levels in the quantile summary, h is additional overhead for pointers that connect the levels in the quantile summary, and N is an amount of the datapoints;

compute, by each processor in parallel at each of the worker nodes, in a first pass of the datapoints of the local data of each the worker nodes, using an approximation algorithm and the maximum relative error ε, a quantile summary of the datapoints that specifies local lower and upper bounds of the quantile ranks for selected datapoints of the local data of each of the worker nodes;

merge, by the processor at the coordinator node, the quantile summaries for the datapoints of the local data of each of the worker nodes, into a constructed summary;

determine, by the processor at the coordinator node, based on the constructed summary, for each quantile rank, second-pass lower and upper bounds for values between which the quantile must occur;

filter out, by each processor in parallel at the worker nodes, in a second pass over the datapoints of the local data at each of the worker nodes, the datapoints that are not between the second-pass lower and upper bounds determined at the coordinator node based on the constructed summary which is based on all of the plurality of worker nodes, to provide subsets of datapoints of the local data at the worker node which are within the second-pass lower and upper bounds from the coordinator node; and collect, by the processor at the coordinator node, from the worker nodes, as collected qualifying data, all of the subsets of datapoints of the local data from the worker nodes which is within the second-pass lower and upper bounds determined at the coordinator node; and compute, by the processor at the coordinator node, based on the quantile ranks and the collected qualifying data which were collected from the worker nodes, the precise quantiles.

10. The non-transitory computer readable medium of claim 9, wherein the instructions are further executed to stream, by the worker nodes, the subsets of datapoints of the local data within the lower and upper bounds, to the coordinator node.

11. The non-transitory computer readable medium of claim 9, wherein the instructions are further executed so that when the lower and upper bounds for all quantiles are identical, then the precise quantile determination is complete.

12. The non-transitory computer readable medium of claim 9, wherein the filtering out instructions are further executed to, by the processor at each of the worker nodes:

collect the datapoints that lie between the lower and upper bounds;

count/exclude the datapoints that are on or below the lower bound;

sort the datapoints that lie between the lower and upper bounds;

select a datapoint of a requested rank from the sorted datapoints; and simultaneously correct the requested rank by the number of datapoints on or below the lower bound.

* * * * *